(12) United States Patent
Kani et al.

(10) Patent No.: US 8,389,166 B2
(45) Date of Patent: Mar. 5, 2013

(54) HYDROGEN GENERATING APPARATUS AND FUEL CELL SYSTEM

(75) Inventors: Yukimune Kani, Osaka (JP); Hidenobu Wakita, Kyoto (JP); Seiji Fujihara, Osaka (JP)

(73) Assignee: Panasonic Corporation, Osaka (JP)

( * ) Notice: Subject to any disclaimer, the term of this patent is extended or adjusted under 35 U.S.C. 154(b) by 737 days.

(21) Appl. No.: 12/525,851

(22) PCT Filed: Dec. 4, 2008

(86) PCT No.: PCT/JP2008/003594
§ 371 (c)(1),
(2), (4) Date: Aug. 5, 2009

(87) PCT Pub. No.: WO2009/072289
PCT Pub. Date: Jun. 11, 2009

(65) Prior Publication Data
US 2010/0330444 A1 Dec. 30, 2010

(30) Foreign Application Priority Data
Dec. 7, 2007 (JP) .................................. 2007-317249

(51) Int. Cl.
*H01M 8/04* (2006.01)
(52) U.S. Cl. ......... 429/410; 429/429; 429/444; 422/105
(58) Field of Classification Search .................. 429/410, 429/427, 429, 443, 444; 422/105
See application file for complete search history.

(56) References Cited

U.S. PATENT DOCUMENTS

| 6,029,100 A | * | 2/2000 | Iwashita et al. | 422/105 X |
| 2004/0175600 A1 | * | 9/2004 | Arthur et al. | 429/17 |
| 2009/0029208 A1 | * | 1/2009 | Katikaneni et al. | 429/22 |

FOREIGN PATENT DOCUMENTS

| JP | 10-237473 | 9/1998 |
| JP | 2002-298892 | 10/2002 |
| JP | 2002-358992 | 12/2002 |
| JP | 2003-215082 | 7/2003 |
| JP | 2004-178975 | 6/2004 |
| JP | 2004-228016 | 8/2004 |
| JP | 2004-362856 | 12/2004 |
| JP | 2006-008459 A | 1/2006 |
| JP | 2007-265857 | 10/2007 |

OTHER PUBLICATIONS

Supplementary European Search Report dated Sep. 20, 2012 issued in corresponding EP Application No. 08855851.5.

* cited by examiner

*Primary Examiner* — Stephen J. Kalafut
(74) *Attorney, Agent, or Firm* — McDermott Will & Emery LLP

(57) ABSTRACT

A hydrogen generating apparatus (10) of the present invention includes a desulfurizer (7) which is supplied with a raw material and which is configured to remove sulfur compounds present in the raw material, a reformer (17) which is configured to form a hydrogen containing gas from the raw material which has passed through the desulfurizer (7), a meter device (3) which is configured to measure the amount of sulfur compounds removed by the desulfurizer (7) (which amount is hereinafter referred to as the amount of removal of sulfur compounds), and a controller (40), wherein the controller (40) is configured so as not to permit the next time start-up if the integrated value of the amount of removal of sulfur compounds measured by the meter device (3) becomes greater than or equal to a first threshold value.

15 Claims, 13 Drawing Sheets

| SULFUR CONCENTRATION x(ppb) | FIRST THRESHOLD VALUE A | SECOND THRESHOLD VALUE B |
|---|---|---|
| $a_1 \leq x < a_2$ | $A_1$ | $B_1$ |
| $a_2 \leq x < a_3$ | $A_2$ | $B_2$ |
| $a_3 \leq x < a_4$ | $A_3$ | $B_3$ |

Fig. 7

| GAS SUPPLY PROVIDER | FIRST THRESHOLD VALUE A | SECOND THRESHOLD VALUE B |
|---|---|---|
| I | $A_4$ | $B_4$ |
| II | $A_5$ | $B_5$ |
| III | $A_6$ | $B_6$ |

Fig. 9

ND FUEL CELL SYSTEM

HYDROGEN GENERATING APPARATUS AND FUEL CELL SYSTEM

RELATED APPLICATIONS

This application is the U.S. National Phase under 35 U.S.C. §371 of International Application No. PCT/JP2008/003594, filed on Dec. 4, 2008, which in turn claims the benefit of Japanese Application No. 2007-317249, filed on Dec. 7, 2007, the disclosures of which Applications are incorporated by reference herein.

TECHNICAL FIELD

The present invention relates to a hydrogen generating apparatus which supplies hydrogen containing gas to a fuel cell, and further relates to a fuel cell system which is equipped with such a hydrogen generating apparatus.

BACKGROUND ART

Fuel cells that generate electric power using a fuel gas and an oxidizing gas have lately attracted attention. As the fuel gas, hydrogen gas is employed. However, general infrastructures needed as the supply means of hydrogen gas have not been established. Therefore, existing gas infrastructures, such as a town gas infrastructure, are utilized whereby hydrogen gas is generated from a supplied town gas, using a hydrogen generating apparatus. The hydrogen generating apparatus includes a reformer which causes a reforming reaction between raw material and water to produce a hydrogen containing gas, a shift converter which removes carbon monoxide contained in the generated hydrogen containing gas by a water gas shift reaction, and a CO oxidizing device which removes residual carbon monoxide present in the hydrogen containing gas by oxidation. Each of these constituent parts employs a respective catalyst suitable for the acceleration of its associated reaction. For example, the reformer uses a catalyst of Ru, Ni, or the like. The shift converter uses a catalyst of Cu—Zn or the like. The CO oxidizing device uses a catalyst of Ru or the like.

Meanwhile, an odorant for the purpose of detection of a gas leak is added to the town gas or other like gas supplied by an existing gas infrastructure. Currently, as the odorant, sulfur compounds including mercaptans (for example, tertiary-butylmercaptan), thiophenes (for example, tetrahydrothiophene), and sulfides (for example, dimethyl sulfide) have usually been used alone or in combination with one another. These sulfur compounds are poisoning components that cause the catalysts used in the aforesaid constituent parts of the hydrogen generating apparatus to undergo deterioration. Therefore, the hydrogen generating apparatus is generally equipped with a desulfurizer adapted to remove sulfur compounds from the town gas prior to its being supplied to the reformer. Such a type of desulfurizer includes a desulfurizer that uses a hydrogenated desulfurization reaction and a desulfurizer that uses an adsorbent. For example, as the desulfurizer that uses an adsorbent, there is a known desulfurizer provided with a zeolite-based adsorption-removal agent capable of adsorptive removal of sulfur compounds at room temperature (see Patent Document 1). In addition, there is a known zeolite based adsorption-removal agent improved so as to maintain the performance of desulfurization over long periods (see Patent Document 2).

Meanwhile, if raw material gas (town gas) containing therein sulfur compounds is continuously supplied to the desulfurizer, the performance of adsorption of the adsorption-removal agent will drop. In this case, the replacement of the desulfurizer itself or the adsorption-removal agent disposed therein is required. Therefore, there is proposed a desulfurizer in which is disposed an adsorption-removal agent with an indicator function capable of facilitating the decision of when to replace the adsorption-removal agent (see Patent Document 3).

Furthermore, there is a known system that calculates, based on the amount of fuel used, the service life of an adsorption-removal agent for displaying the time for replacement or transmitting it to an external maintenance terminal (see Patent Document 4).

In addition, there is a known technique in which, subject to the replacement of the desulfurizer or the like, warning information is displayed when the remaining service life of an article of consumption falls within a predetermined range, and if no response is made within a predetermined period of time since the displaying of such warning information, the system is automatically shut down (see Patent Document 5).

Patent Document 1: Japanese Laid-Open Patent Application Publication No. Hei. 10-237473
Patent Document 2: Japanese Laid-Open Patent Application Publication No. 2004-228016
Patent Document 3: Japanese Laid-Open Patent Application Publication No. 2002-358992
Patent Document 4: Japanese Laid-Open Patent Application Publication No. 2004-362856
Patent Document 5: Japanese Laid-Open Patent Application Publication No. 2002-298892

DISCLOSURE OF THE INVENTION

Problems to be Solved by the Invention

However, for the case of a hydrogen generating apparatus equipped with a conventional desulfurizer (for example, as in the configuration shown in Patent Document 1 or Patent Document 5), even if the hydrogen generating apparatus or the fuel cell system is started up although the remaining service life of the desulfurizer is short in the state that the hydrogen generating apparatus or the fuel cell system is shut down, the end of the service life of the desulfurizer will soon be reached. As a result, it is required that the hydrogen generating apparatus or the fuel cell system be shut down in the course of the start-up thereof, or that the hydrogen generating apparatus or the fuel cell system be shut down, despite the fact that the fuel cell system has not properly operated as required or has not generated sufficient electric power. This causes the problem that raw material required for the star-up is used in vain.

The present invention was made in order to overcome the problems with the prior art techniques. Accordingly, an object of the present invention is to provide a hydrogen generating apparatus capable of providing operation control of suppressing the wasteful consumption of raw material depending on the service life of a desulfurizer and capable of contributing to the saving of energy, and a fuel cell system equipped with such a hydrogen generating apparatus.

Means for Solving the Problems

As a result of their intensive researches, the inventors of the present application came to the following conclusion.

In a typical fuel cell system using a fuel cell, its start-up and shutdown operations are often carried out according to the demand for electric power or according to the demand for heat, with a view to enhancing the efficiency of generating electric power. For example, in the case where the fuel cell system is used as a cogeneration system for household use, there is an operation method (DSS (Daily Start-up & Shut-down) operation). The system is shut down during a time zone (e.g., midnight) in which the amount of consumption of electric power is small while on the other hand electric power is generated during a time zone in which the amount of consumption of electric power is great.

In such a case, however, the generation of electric power will not commence as soon as the fuel cell system is started up from the shutdown state. That is, it is not until the hydrogen generating apparatus of the fuel cell system is placed in a predetermined state (for example, a state in which the temperature of the reformer disposed in the hydrogen generating apparatus becomes higher than or equal to a predetermined temperature) in which state it becomes ready to generate hydrogen that the generation of electric power by the fuel cell system becomes possible. In order to accelerate the reforming reaction of raw material and water in the reformer of the hydrogen generating apparatus, temperatures of about 600 to about 700 degrees Centigrade are required, and the energy necessary for a rising to such temperatures is obtained, in many cases, by burning of raw material or off-gas. That is to say, certain amounts of energy are required from the time the fuel cell system is started up from the shutdown state to the time the fuel cell system becomes ready to generate electric power. And, the amount of such energy is generally called the start-up energy, and depends partly on the size or the performance of hydrogen generating apparatus.

In addition, in the reforming reaction of raw material with water in the reformer, raw material, from which sulfur compounds contained in the raw material have been removed by the adsorption-removal agent of the desulfurizer, is used. However, if most of the adsorption-removal agent of the desulfurizer enters the state of saturated adsorption, it becomes impossible to efficiently accomplish adsorptive removal of sulfur compounds present in the raw material, which means that the raw material still contains residual sulfur compounds after its passage through the desulfurizer. Consequently, the reforming catalyst disposed in the reformer is poisoned by the residual sulfur compounds, and undergoes considerable deterioration. If the reforming catalyst deteriorates, it becomes impossible to produce hydrogen containing gas necessary for the fuel cell system to generate electric power. Therefore, if the upper limit value of the amount of supply of raw material that enables the desulfurizer (or the adsorption-removal agent disposed in the desulfurizer) to efficiently exhibit its adsorptive performance is defined as the service life of the desulfurizer, then the overuse of the desulfurizer in excess of the service life thus defined has to be avoided.

On the other hand, as shown in Patent Document 5, if the apparatus is shut down whenever the end of the service life of the desulfurizer is reached during the generation of electric power by the apparatus (the fuel cell system), this will overcome the aforesaid inconvenience. However, even if, in the configuration of Patent Document 5, the fuel cell system is started up when the remaining service life of the desulfurizer is short in the state that the fuel cell system is shut down, the end of the service life of the desulfurizer is reached in the course of the start-up of the hydrogen generating apparatus and the fuel cell system or in the course of the generation of electric power. Accordingly, the hydrogen generating apparatus and the fuel cell system have to be shut down. This results in the wasteful consumption of raw material supplied to activate the hydrogen generating apparatus and the fuel cell system.

Therefore, the present invention provides a hydrogen generating apparatus which includes a desulfurizer which is supplied with a raw material and which is configured to remove sulfur compounds present in the raw material, a reformer which is configured to generate a hydrogen containing gas from the raw material which has passed through the desulfurizer, a meter device which is configured to measure an amount of the sulfur compounds removed by the desulfurizer (hereinafter referred to as an amount of removal of sulfur compounds), and a controller, wherein the controller is configured so as not to permit next time start-up of the hydrogen generating apparatus if an integrated value of the amount of removal of sulfur compounds measured by the meter device becomes greater than or equal to a first threshold value.

In such a configuration, if the integrated value of the amount of removal of sulfur compounds in the desulfurizer becomes greater than or equal to the first threshold value (in other words, if the end of the service life of the desulfurizer is almost reached) when the hydrogen generating apparatus is in operation, then the next time start-up of the hydrogen generating apparatus is not permitted thereby suppressing the supply of raw material, whose content of sulfur compounds has not been reduced enough, to the reformer. As a result, the catalysts disposed in the reformer and the other constituent parts are prevented from being poisoned. In addition, it also becomes possible to suppress the wasteful consumption of raw material caused when the hydrogen generating apparatus is started up in vain.

The hydrogen generating apparatus may further include an upper limit removal amount information acquiring device which is configured to acquire information regarding an upper limit value of the amount of removal of sulfur compounds of the desulfurizer (which information is hereinafter referred to as an upper limit removal amount information), and a threshold value setting device which is configured to set the first threshold value based on the acquired upper limit removal amount information.

In such a configuration, it becomes possible to properly set the first threshold value in response to the upper limit adsorption amount information of the desulfurizer. This makes it possible to properly operate the hydrogen generating apparatus depending on the remaining service life of the desulfurizer.

The hydrogen generating apparatus may further include a sulfur concentration information acquiring device which is configured to acquire information regarding concentration of sulfur present in the raw material (which information is hereinafter referred to as sulfur concentration information), and a threshold value setting device which is configured to set the first threshold value based on the acquired sulfur concentration information.

In such a configuration, it becomes possible to properly set the first threshold value in response to the sulfur concentration information of the raw material. For example, even in the case where the concentration of sulfur present in the raw material differs depending on the raw material (town gas) supply provider (gas company), it is still possible to properly set the first threshold value. This makes it possible to properly operate the hydrogen generating apparatus depending on the remaining service life of the desulfurizer.

The controller may be configured so as to perform an operation that urges replacement of the desulfurizer if the integrated value of the amount of removal of sulfur compounds measured by the meter device becomes greater than or equal to the first threshold value.

The hydrogen generating apparatus may further include an alarm device, wherein the controller is configured so as to use the alarm device to provide warning information indicating that the desulfurizer should be replaced, as the operation that urges replacement of the desulfurizer.

In such a configuration, it becomes possible that, when the remaining service life of the desulfurizer is short, any inconvenience attributed to the service life of the desulfurizer is prevented from occurrence because the user or the maintenance personnel is urged to replace the desulfurizer.

The desulfurizer may be provided with an adsorption-removal agent for adsorption removal of the sulfur compounds present in the raw material.

The controller may be configured such that: if the integrated value of the amount of removal of sulfur compounds measured by the meter device becomes greater than or equal to the first threshold value during an operation of the hydrogen generating apparatus, the operation of the hydrogen generating apparatus is shut down, and if, after a shutdown process of the hydrogen generating apparatus is started when the integrated value of the amount of removal of sulfur compounds measured is less than the first threshold value, the integrated value of the amount of removal of sulfur compounds measured becomes greater than or equal to the second threshold value that is smaller than the first threshold value, the start-up of the hydrogen generating apparatus is not permitted.

In such a configuration, when the integrated value of the amount of supply of raw material to the desulfurizer becomes greater than or equal to the first threshold value during the operation of the hydrogen generating apparatus (in other words, when the end of the service life of the desulfurizer is reached shortly), the hydrogen generating apparatus is placed out of operation thereby to suppress the supply of raw material, whose content of sulfur compound has not been reduced enough, to the reformer. As a result, the catalysts disposed in the reformer and the other constituent parts are prevented from being poisoned. Furthermore, when, after the start of the process of shutting down the hydrogen generating apparatus, the integrated value of the amount of supply of raw material is greater than or equal to the second threshold value that is smaller than the first threshold value (in other words, when the remaining service life of the desulfurizer is short), the hydrogen generating apparatus is not started up so that any energy-wasting operation that cannot be continued enough due to the service life of the desulfurizer is suppressed. This suppresses the wasteful consumption of energy, thereby contributing to the saving of energy.

The controller may be configured such that, if, after a shutdown process of the hydrogen generating apparatus is started when the integrated value of the amount of removal of sulfur compounds measured is less than the first threshold value, the integrated value of the amount of removal of sulfur compounds measured becomes greater than or equal to the second threshold value that is smaller than the first threshold value, an operation that urges replacement of the desulfurizer is performed.

In such a configuration, it becomes possible that, when the remaining service life of the desulfurizer is short, the user or the maintenance personnel is urged to replace the desulfurizer, thereby preventing an energy wasting operation, such as an operation that is brought to a stop while not being continued enough due to the service life of the desulfurizer, from being performed.

The hydrogen generating apparatus may be configured such that it further includes an upper limit removal amount information acquiring device which is configured to acquire information regarding an upper limit value of the amount of removal of sulfur compounds of the desulfurizer (which information is hereinafter referred to as an upper limit removal amount information), and a threshold value setting device which is configured to set at least either one of the first threshold value and the second threshold value based on the acquired upper limit removal amount information.

In such a configuration, it becomes possible to properly set either the first threshold value or the second threshold value in response to the information about the upper limit of the amount of adsorption of the desulfurizer. This makes it possible that, depending on the remaining service life of the desulfurizer, the hydrogen generating apparatus is operated in a proper manner.

The hydrogen generating apparatus may be configured such that it further includes a sulfur concentration information acquiring device which is configured to acquire information regarding the concentration of sulfur present in the raw material (which information is hereinafter referred to as the sulfur concentration information), and a threshold value setting device which is configured to set at least either one of the first threshold value and the second threshold value based on the acquired sulfur concentration information.

In such a configuration, it becomes possible to properly set either the first threshold value or the second threshold value in response to the sulfur concentration information of the raw material. For example, even in the case where the concentration of sulfur present in the raw material differs depending on the raw material (town gas) supply provider (gas company), it is still possible to properly set either the first threshold value or the second threshold value. This makes it possible to properly operate the hydrogen generating apparatus depending on the remaining service life of the desulfurizer.

It is preferred that the second threshold value is smaller than the value obtained by subtracting from the first threshold value, at least the amount of removal of sulfur compounds corresponding to the integrated value of the amount of supply of raw material required at a time of start-up of the hydrogen generating apparatus.

As a result of such an arrangement, any inconvenience such that the hydrogen generating apparatus has to be stopped immediately after or in the course of the start-up thereof is eliminated.

It is preferred that the second threshold value is the value obtained by subtracting from the first threshold value, a sum of the amount of removal of sulfur compounds corresponding to the integrated value of the amount of supply of raw material required at time of start-up of the hydrogen generating apparatus and a value less than the amount of removal of sulfur compounds corresponding to an average integrated value of the amount of supply of raw material during an operation of the hydrogen generating apparatus.

As a result of such an arrangement, it becomes possible to suppress the wasteful consumption of energy taking place when the hydrogen generating apparatus is started up, but has to be stopped in a shorter period of time than the normal average operation time due to the service life of the desulfurizer.

The controller may be configured so as to reset the integrated value of the amount of removal of sulfur compounds measured by the meter device to zero after the replacement of the desulfurizer.

In such a configuration, it becomes possible to correctly determine when to next replace the desulfurizer.

The controller may be configured such that if the integrated value of the amount of removal of sulfur compounds measured by the meter device becomes greater than or equal to the first threshold value during an operation of the hydrogen generating apparatus, the operation of the hydrogen generating apparatus is continued, and thereafter, if the hydrogen generating apparatus is shut down, the start-up thereof is not permitted.

Such a configuration enables the operation to be continued for a while by making use of the degree of allowance of the desulfurizer. As a result, the demerit that the user is unable to use the hydrogen generating apparatus is reduced and, in addition, since the user is allowed to make maximum use of the hydrogen generating apparatus, this makes it possible to maintain the characteristic of the saving of energy.

In addition, the present invention provides a fuel cell system which includes any one of the aforesaid hydrogen generating apparatuses and a fuel cell which is configured to generate electric power using a hydrogen containing gas supplied from the aforesaid any one hydrogen generating apparatus.

These and other objects, features, and advantages of the invention will be made more clear with reference to the following detailed description of each of preferred embodiments in connection with the accompanying drawings.

Advantageous Effects of the Invention

The hydrogen generating apparatus and the fuel cell system of the present invention provide, because of their configurations as described above, the advantageous effect that the wasteful consumption of raw material is suppressed depending on the service life of desulfurizer, thereby accomplishing operation control that contributes to the saving of energy.

BRIEF DESCRIPTION OF THE DRAWINGS

FIG. 7 is a diagram representing a correspondence relationship of the concentration of sulfur obtained by means of a sulfur concentration acquiring device with respect to the first and second threshold values A and B.

FIG. 9 is a diagram representing a correspondence relationship of the information indirectly regarding the concentration of sulfur present in a raw material (the information about the town gas (raw material) supply companies (gas supply provider) with respect to the first and second threshold values A and B.

REFERENCE NUMERALS IN THE DRAWINGS

Figure 1:
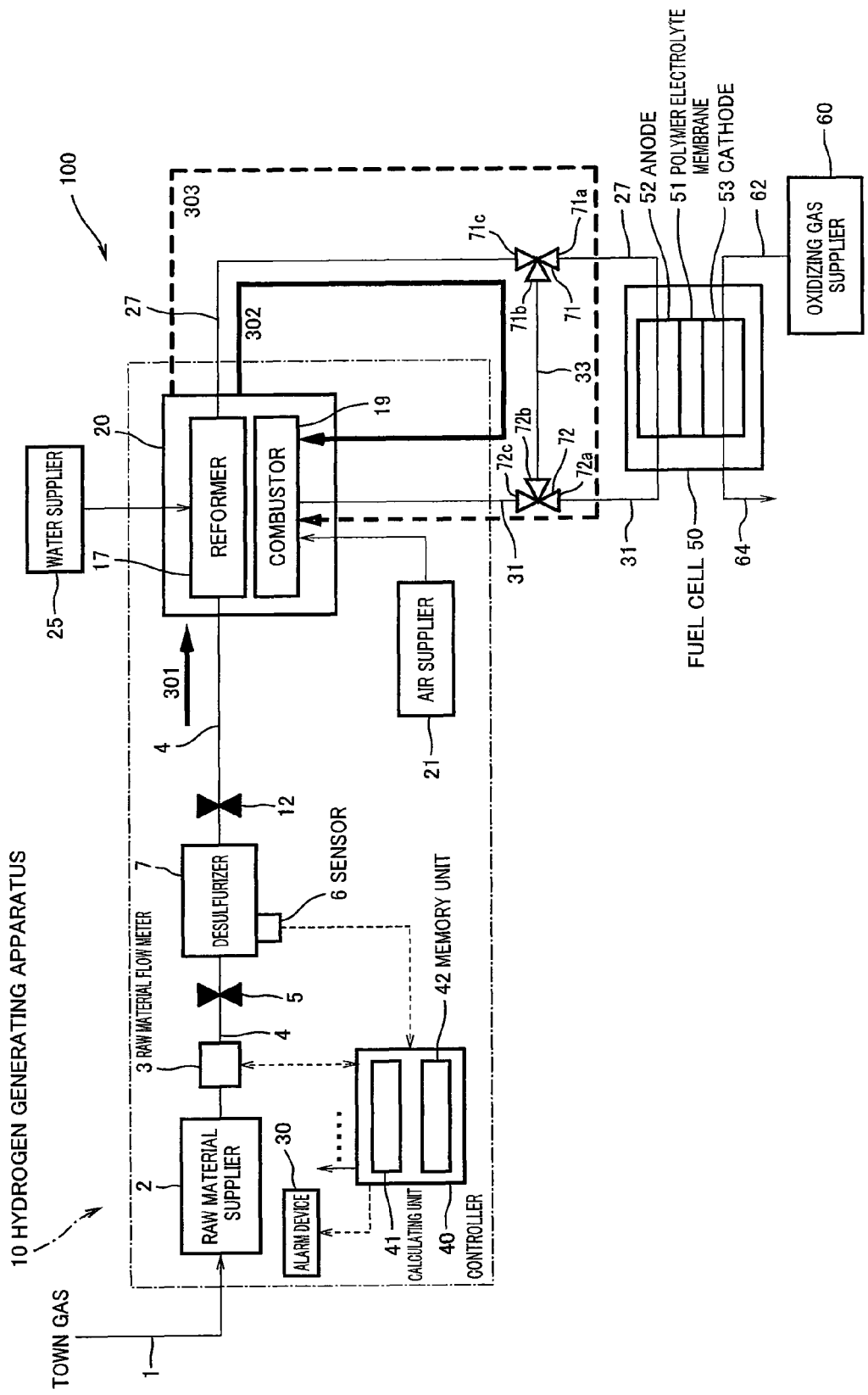
FIG. 1 is a block diagram schematically illustrating the configurations of a hydrogen generating apparatus and a fuel cell system according to a first embodiment of the present invention.

| | |
|---|---|
| 1 | gas infrastructure |
| 2 | raw material supplier |
| 3 | raw material flow meter (meter device for measuring the amount of supply of raw material) |
| 4 | raw material supply passage |
| 5 | first connecting portion |
| 6 | sensor (replacement information acquiring device) |
| 7 | desulfurizer |
| 8 | upper limit adsorption amount acquiring device (upper limit adsorption amount information acquiring device) |
| 9 | sulfur concentration acquiring device (sulfur concentration information acquiring device) |
| 10 | hydrogen generating apparatus |
| 12 | second connecting portion |
| 17 | reformer |
| 19 | combustor |
| 20 | fuel processor |
| 21 | air supplier |
| 25 | water supplier |
| 27 | fuel gas supply passage |
| 30 | alarm device |
| 31 | fuel gas exhaust passage |
| 33 | bypass passage |
| 40 | controller |
| 41 | calculating unit |
| 42 | memory unit |
| 43 | threshold value setting unit (threshold value setting device) |
| 45 | input unit |
| 46 | learning unit |
| 50 | fuel cell |
| 51 | polymer-electrolyte membrane |
| 52 | anode |
| 53 | cathode |
| 60 | oxidizing gas supplier |
| 62 | oxidizing gas supply passage |
| 64 | oxidizing gas exhaust passage |
| 71 | first three-way valve |
| 71a, 72a | first port |
| 71b, 72b | second port |
| 71c, 72c | third port |
| 72 | second three-way valve |
| 100 | fuel cell system |
| 301 | raw material flow |
| 302 | raw material and fuel gas flow |
| 303 | fuel gas and off-gas flow |
| A | first threshold value |
| B | second threshold value |
| L | upper limit of the integrated value of the amount of supply of raw material |

BEST MODE FOR CARRYING OUT THE INVENTION

Hereinafter, preferred embodiments of the present invention will be described with reference to the drawings. In addition, hereinafter, the same or similar components will be assigned the same reference numerals throughout the drawings, and their description may be omitted in order avoid the repetitive description.

First Embodiment

Figure 2:
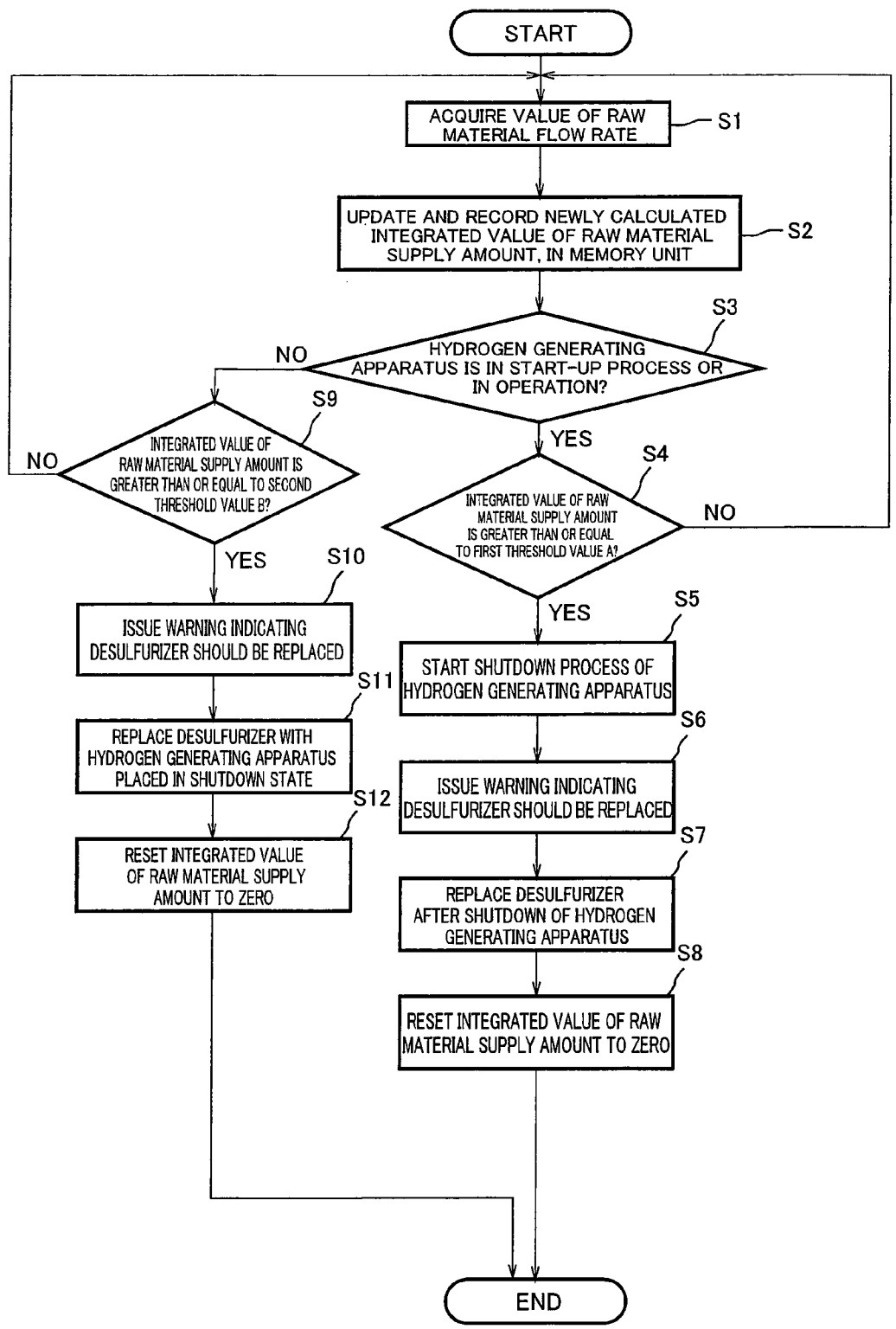
FIG. 2 is a flow chart representing a control program that determines the necessity of replacing a desulfurizer mounted in the hydrogen generating apparatus of FIG. 1.
Figure 3:
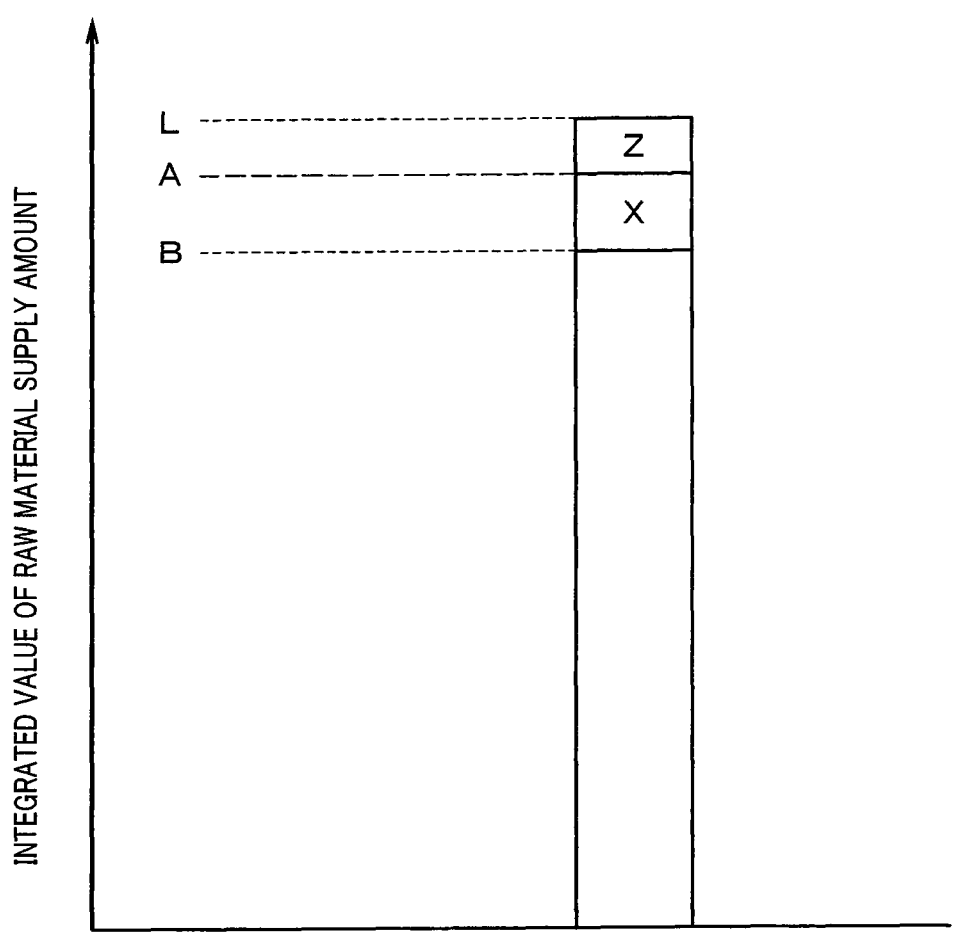
FIG. 3 is a bar graph representing a relationship between a first threshold value and a second threshold value of the integrated value of the amount of supply of raw material in the first embodiment.
Figure 4:
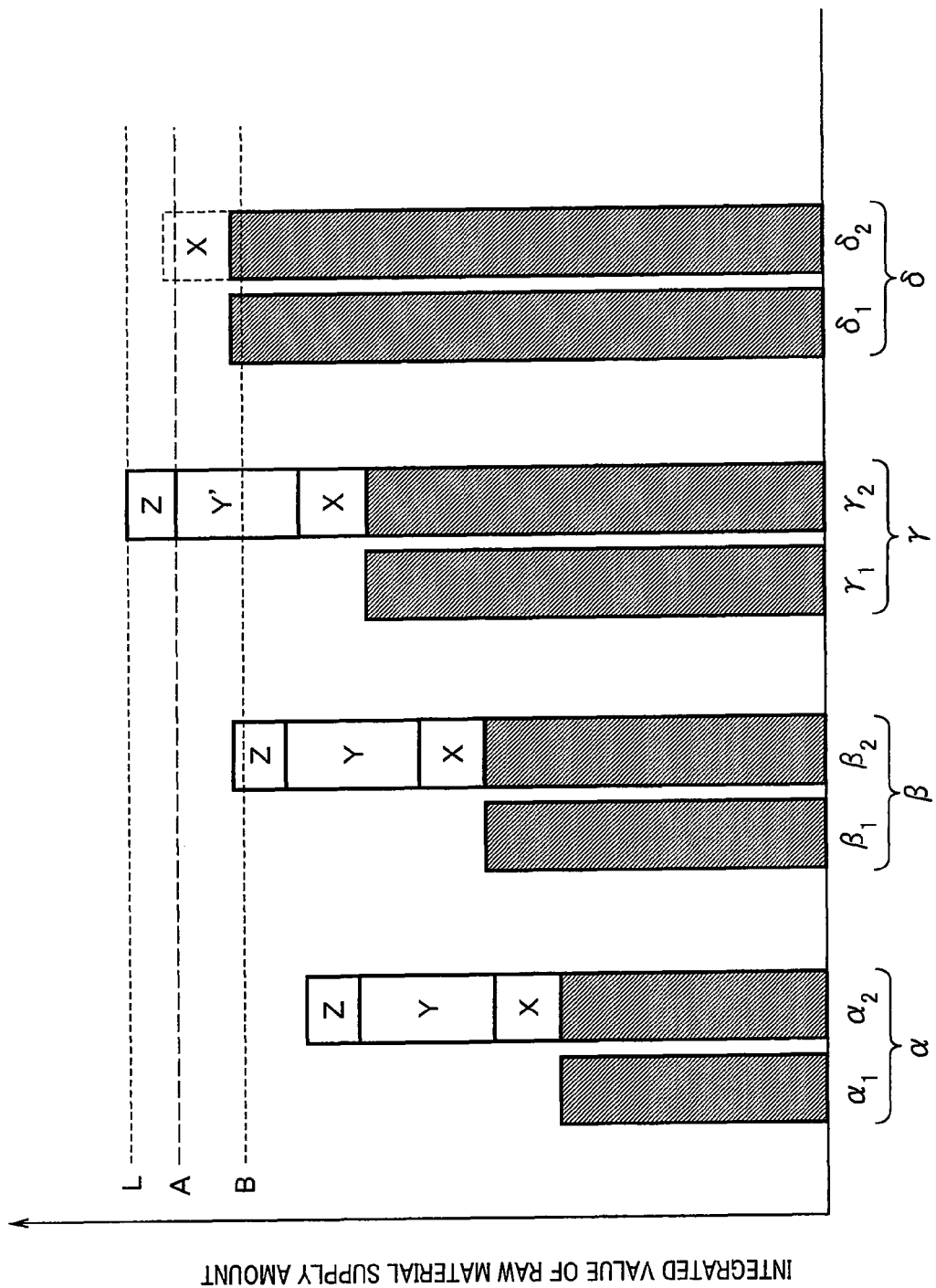
FIG. 4 is a bar graph representing a relationship between the integrated value of the amount of supply of raw material and the operation of the hydrogen generating apparatus in the first embodiment.

FIG. 1 is a block diagram schematically illustrating the configurations of a hydrogen generating apparatus and a fuel cell system according to a first embodiment of the present invention. FIG. 2 is a flow chart representing a control program that determines the necessity of replacing a desulfurizer mounted in the hydrogen generating apparatus of FIG. 1. FIG. 3 is a bar graph representing a relationship between a first threshold value and a second threshold value of the integrated value of the amount of supply of raw material. FIG. 4 is a bar graph representing a relationship between the integrated value of the amount of supply of raw material and the operation of the hydrogen generating apparatus. Hereinafter, referring to FIGS. 1 through 4, the hydrogen generating apparatus and the fuel cell system according to the present embodiment will be described.

In the first place, a description will be made about the fuel cell system 100 of the present embodiment.

The fuel cell system 100 includes a fuel cell 50, a hydrogen generating apparatus 10, and an oxidizing gas supplier 60. A detailed description of the configuration of the hydrogen generating apparatus 10 will be made later.

In the present embodiment, the fuel cell 50 is constituted by a polymer electrolyte fuel cell. The polymer electrolyte fuel cell is in the form of a fuel cell stack in which a plurality of cells are stacked and fastened together. Each individual cell includes an MEA (membrane electrode assembly, not shown) in which a polymer-electrolyte membrane 51 is sandwiched between an anode 52 and a cathode 53, an anode-side separator (not shown) disposed on a principal surface of the MEA on the side of the anode 52, and a cathode-side separator (not shown) disposed on a principal surface of the MEA on the side of the cathode 53. In addition, the polymer electrolyte fuel cell is configured in a way well-known to those skilled in the art, and a detailed description other than the above is omitted here.

Communicated with the cathode 53 of the fuel cell 50 is the downstream end of an oxidizing gas supply passage 62. The upstream end of the oxidizing gas supply passage 62 is connected to the oxidizing gas supply unit 60. With this, oxidizing gas is supplied to the cathode 53 from the oxidizing gas supply unit 60. In the present embodiment, air is employed as an oxidizing gas. Further communicated with the cathode 53 is the upstream end of an oxidizing gas exhaust passage 64. The downstream end of the oxidizing gas exhaust passage 64 is opened to the atmosphere (not shown).

Communicated with the anode 52 of the fuel cell 50 is the downstream end of a fuel gas supply passage 27. The upstream end of the fuel gas supply passage 27 is connected to a fuel processor 20 of the hydrogen generating apparatus 10. With this, hydrogen containing gas generated in the fuel processor 20 (which gas is hereinafter referred to as the "fuel gas" in some cases) is supplied to the anode 52. And, by a cell reaction between the fuel gas supplied to the anode 52 and the oxidizing gas supplied to the cathode 53, heat and electricity are generated.

Arranged on a position of the fuel gas supply passage 27 is a first three-way valve 71. The first three-way valve 71 has a first port 71a, a second port 71b, and a third port 71c. The first three-way valve 71 is configured such that the third port 71c is selectively communicable with either the first port 71a or the second port 71b.

Connected to the third port 71c of the first three-way valve 71 is the fuel gas supply passage 27 on the side of the hydrogen generating apparatus 10 (the fuel processor 20).

The second port 71b of the first three-way valve 71 is connected via a bypass passage 33 to a second port 72b of a second three-way valve 72 described later. Bypass passage 33 causes a fuel gas to bypass the fuel cell 50 (the anode 52), so that the fuel gas is supplied from the fuel processor 20 through the bypass passage 33 to a combustor 19.

Connected to the first port 71a of the first three-way valve 71 is the fuel gas supply passage 27 on the side of the anode 52 of the fuel cell 50. Further communicated with the anode 52 of the fuel cell 50 is the upstream end of a fuel gas exhaust passage 31. Fuel gas, supplied to the anode 52 from the fuel gas supply passage 27 and remaining unreacted with oxidizing gas, flows through the fuel gas exhaust passage 31.

Arranged on a position of the fuel gas exhaust passage 31 is a second three-way valve 72. The second three-way valve 72 has a first port 72a, a second port 72b, and a third port 72c. The second three-way valve 72 is configured such that the third port 72c is selectively communicable with either the first port 72a or the second port 72b.

Connected to the first port 72a of the second three-way valve 72 is the fuel gas exhaust passage 31 on the side of the fuel cell 50.

Connected via the bypass passage 33 to the second port 72b of the second three-way valve 72 is the second port 71b of the first three-way valve 71, as described above.

Connected to the third port 72c of the second three-way valve 72 is the fuel gas exhaust passage 31 on the side of the combustor 19. The downstream end of the fuel gas exhaust passage 31 is connected to the combustor 19. The combustor 19 is supplied with either an unreacted fuel gas flowing out from the anode 52 or a gas bypassing the fuel cell 50 (the anode 52) (gas flowing through the bypass passage 33). In the combustor 19, unreacted fuel gas or the like exhausted from the anode 52 is burnt and the resulting heat is supplied to a reformer 17. This heat is used in a reforming reaction between raw material gas (hereinafter referred to just as the "raw material") and water in the reformer 17.

Next, a detailed description will be made about the hydrogen generating apparatus 10 of the present embodiment. The hardware of the hydrogen generating apparatus 10 will be described first.

As shown in FIG. 1, the hydrogen generating apparatus 10 of the present embodiment includes, as its main components, a raw material supplier 2, a desulfurizer 7, a fuel processor 20, a raw material flow meter (a meter device for measuring the amount of supply of raw material) 3 which serves as a sulfur compound removal amount meter device, and a controller 40.

The sulfur compound removal amount meter device is a meter device for measuring the amount of sulfur compounds removed by the desulfurizer (i.e., the sulfur compound removal amount) of the present invention. The meter device for measuring the amount of removal of sulfur compounds includes both a meter device for measuring the amount of removal of sulfur compounds itself (i.e., a meter device for direct measurement of the amount of removal of sulfur compounds) and a meter device for measuring a physical quantity associated with the amount of removal of sulfur compounds (i.e., a meter device for indirect measurement of the amount of removal of sulfur compounds). As a typical sulfur compound removal amount meter device, there is, for example, a raw material flow meter. In the present embodiment, such a raw material flow meter serves as a sulfur compound removal amount meter device. The raw material flow meter is a meter device for indirect measurement of the amount of removal of sulfur compounds. The amount of removal of sulfur compounds may be derived by the multiplication of the amount of supply of raw material measured by the raw material flow meter by, for example, the concentration of sulfur compounds present in the raw material. In this case, as concentration of sulfur compounds present in the raw material, it is possible to use a nominal value of the raw material in the gas infrastructure, an actually measured value obtained beforehand, or other like value. Of course, it is possible to measure the concentration of sulfur compounds present in the raw material and to use the value measured as the concentration of sulfur compounds present in the raw material. In addition, the precondition in this case is that the rate of removal of sulfur compounds from the raw material by the desulfurizer is about 100 percent; however, if not so, it is still possible to correctly derive the sulfur compound removal amount by the multiplication of the product, obtained by multiplying the amount of supply of raw material and the concentration of sulfur compounds, by the rate of removal in question. As the rate of removal of sulfur compounds present in the raw material by the desulfurizer, it is possible to use a nominal value available from the manufacturer, an actually measured value obtained in advance, or other like value.

In addition, the meter device for measuring the amount of supply of raw material is meant to include both a meter device for measuring the amount of supply of raw material itself (i.e., a meter device for direct measurement of the amount of supply of raw material) and a meter device for measuring a physical quantity regarding the amount of supply of raw material (i.e., a meter device for indirect measurement of the amount of supply of raw material). As the physical quantity associated with the amount of supply of raw material, there are given, by way of example, various physical quantities such as the amount of supply of water to the reformer and the time of the operation of the hydrogen generating apparatus and, for the case of a fuel cell system in combination of a hydrogen generating apparatus and a fuel cell, the amount of generation of electric power of the fuel cell, the amount of recovery of exhaust heat from the fuel cell, the time of the generation of electric power of the fuel cell, the number of times the system is started up/shut down and so on. In addition, the present embodiment employs a meter device adapted to measure the amount of supply of raw material itself (a meter device for direct measurement of the amount of supply of raw material), and a description will be given of the case where the amount of supply of raw material itself is measured by means of the meter device.

The raw material supplier 2 is constituted by, for example, a plunger pump, a flow rate regulator et cetera, and is connected to an existing gas (town gas) infrastructure 1. The gas infrastructure 1 supplies town gas as a raw material to the raw material supplier 2. Town gas supplied from the gas infrastructure 1 to the raw material supplier 2 contains a sulfur compound as an odorant. Connected to the raw material supplier 2 is the upstream end of a raw material supply passage 4. The downstream end of the raw material supply passage 4 is connected to the fuel processor 20. Along the raw material supply passage 4, there are sequentially arranged a raw material flow meter 3, a first connecting portion 5, a desulfurizer 7, and a second connecting portion 12 in that order from upstream to downstream. The desulfurizer 7 is mountable to and demountable from the raw material supply passage 4 through the first and second connecting portions 5 and 12. A raw material supplied from the gas infrastructure 1 to the raw material supplier 2 is fed to the desulfurizer 7.

The raw material flow meter 3 measures the amount of supply of raw material provided from the raw material supplier 2 to the desulfurizer 7 (hereinafter referred to as the "raw material supply amount"). In addition, a detailed description will be given of the calculation of the integrated value of the amount of supply of raw material based on the value measured by the raw material flow meter 3.

There is no specific limitation on the desulfurizer 7 as long as it is capable of removal of sulfur compounds from the raw material. In the present embodiment, the desulfurizer 7 is provided with an adsorption-removal agent (not shown). The adsorption-removal agent is used to adsorptively remove sulfur compounds contained in the raw material supplied to the desulfurizer 7. As the adsorption-removal agent, for example, zeolite-based adsorption-removal agents may be used. It is possible to use, as the zeolite-based adsorption-removal agent, one that is known in the art, and its detailed description is omitted here accordingly. In addition, as the desulfurizer 7, it is possible to employ a desulfurizer that utilizes a hydrogenated desulfurization reaction.

The raw material, whose sulfur compound content has been removed by the desulfurizer 7, is supplied through the raw material supply passage 4 to the fuel processor 20 (the reformer 17).

The fuel processor 20 includes a combustor 19, a reformer 17, a shift converter (not shown), and a CO remover (not shown).

The combustor 19 is constituted by, for example, a flame burner. Connected to the combustor 19 is an air supplier 21. The air supplier 21 supplies air for combustion (combustion air) to the combustor 19. On the other hand, the combustor 19 is supplied, as a combustion fuel, with raw material (combustion gas) already passed by the time the temperature of the reformer 17 increases to a predetermined level of temperature, fuel gas (combustion gas) whose carbon monoxide concentration has not yet reduced to a level suppliable to the fuel cell 50, or unreacted fuel gas (off-gas (combustion gas)) exhausted from the anode 52 of the fuel cell 50. In the combustor 19, the combustion gas is burnt and the resulting heat is supplied to the reformer 17. The combustor 19 may be configured to be incorporated into the fuel processor 20 (as in the present embodiment) or may be configured as a separate component from the fuel processor 20.

The reformer 17 is provided with a reforming catalyst. Here, a Ru-based catalyst is used as the reforming catalyst. Connected to the reformer 17 is a water supplier 25. In the present embodiment, the water supplier 25 is constructed in a way well-known to those skilled in the art, and includes components, such as a water supply source (e.g., a water tank), a pump, a flow rate regulating device et cetera. The water supplier 25 supplies water (steam) required for a reforming reaction to the reformer 17. Used as the supply water is water obtained by purifying, in advance, city water by means of activated carbon, ion-exchange resin, or other like substance. The reformer 17 is supplied with a raw material whose sulfur compound content has been removed by the desulfurizer 7 and water from the water supplier 25. In the reformer 17, these supplied raw material and water are subjected to a reforming reaction using the reforming catalyst, whereby hydrogen containing gas is generated. Heat supplied from the combustor 19 is utilized in the reforming reaction. The hydrogen containing gas generated in the reformer 17 is fed to the shift converter.

The shift converter is provided with a shift conversion catalyst. As the shift conversion catalyst, a Cu—Zn based catalyst is used here. In the shift converter, carbon monoxide contained in the hydrogen containing gas supplied from the reformer 17 is brought into a shift reaction by means of the shift conversion catalyst to reduce the concentration of carbon monoxide. The hydrogen containing gas whose carbon monoxide concentration has been reduced in the shift converter is fed to the CO oxidizing device.

The CO oxidizing device is provided with a CO oxidation catalyst. As the CO oxidation catalyst, a Ru-based catalyst is used here. In the CO oxidizing device, the concentration of carbon monoxide contained in the hydrogen containing gas supplied from the shift converter is further reduced by a CO oxidation reaction by means of the CO oxidation catalyst. More specifically, the concentration of carbon monoxide contained in the hydrogen containing gas is reduced to 20 ppm or lower, preferably 10 ppm or lower. The hydrogen containing gas having such a reduced concentration of carbon monoxide is fed to the anode 52 of the fuel cell 50 as a fuel gas.

Next, the control system of the hydrogen generating apparatus 10 in the present embodiment will be described.

The hydrogen generating apparatus 10 of the present embodiment includes a sensor 6 as a replacement information acquiring device for the replacement of the desulfurizer 7 (or the adsorption-removal agent disposed in the desulfurizer 7). The sensor 6 is disposed in the desulfurizer 7. The sensor 6 is configured to detect information about the replacement of the desulfurizer 7 (or the adsorption-removal agent disposed in the desulfurizer 7) and the information detected is fed to a later-described controller 40. The present embodiment uses, as the sensor 6, a contact type sensor such as a contact switch or the like. The sensor 6 is provided in a mount part of the desulfurizer 7. The sensor 6 (implemented by a contact switch or other like means) is turned on/off when the desulfurizer 7 is mounted/removed, and this on/off signal is fed to the controller 40 (described later) as replacement information of the desulfurizer 7 (or the adsorption-removal agent disposed in the desulfurizer 7). In addition, it may be arranged such that an IC tag reader is used as the sensor 6 and the desulfurizer 7 is mounted an IC tag or the like which stores an individual body number assigned to the desulfurizer 7. In this case, the IC tag reader reads an individual body number from the IC tag for transmission to the controller 40, and the controller 40 makes a decision that a replacement takes place if there is a change in the individual body number of the IC tag. In addition, it does not matter that the replacement information acquiring device is in the form of an input device (not shown) to which the user himself inputs a piece of information indicating that the desulfurizer has been replaced.

The hydrogen generating apparatus 10 of the present embodiment includes the raw material flow meter 3 serving as a meter device for measuring the amount of supply of raw material, as described above. The raw material flow meter 3 measures the amount of supply of raw material provided from the raw material supplier 2 to the desulfurizer 7. The amount of supply of raw material thus measured is fed to the controller 40 (described later). In addition, although here the raw material flow meter 3 is disposed in the raw material supply passage 4 between the raw material supplier 2 and the desulfurizer 7 (more specifically, the first connecting portion 5), it may be configured such that the raw material flow meter 3 is incorporated into the raw material supplier 2. This configuration is applicable to each of the embodiments of the present invention described later.

The hydrogen generating apparatus 10 includes the controller 40. The controller 40 is constituted by, for example, a microcomputer, and includes a calculating unit 41 and a memory unit 42 in the present embodiment. The memory unit 42 is constituted by an internal memory of the microcomputer, and by the execution of software stored in the internal memory by a CPU of the microcomputer the calculating unit 41 (and a threshold value setting unit 43 of the second embodiment) is realized. The memory unit 42 stores a control program and a first threshold value A and a second threshold value B (described later), and other like data, and the calculating unit 41 executes the control program and so on thus stored. Here, the controller 40 controls desired components including the aforesaid components of the hydrogen generating apparatus 10 and the fuel cell system 100, thereby to control the operations of the hydrogen generating apparatus 10 and the fuel cell system 100. In addition, although in the present embodiment the hydrogen generating apparatus 10 includes controller 40, the control unit (not shown) of the fuel cell system 100 may function also as a controller for controlling the operation of the hydrogen generating apparatus 10. In addition, in the specification, the controller means not only a single independent controller but also a group of controllers in which a plurality of controllers cooperatively execute control operations. Therefore, the controller 40 is not necessarily constituted by a single independent controller, and it may be arranged such that a plurality of controllers are dispersedly arranged, and cooperatively control the operations of the hydrogen generating apparatus 10 and the fuel cell system 100.

Next, the general operations of the hydrogen generating apparatus 10 and the fuel cell system 100 in the present embodiment will be described. In addition, in the present embodiment, the operations of the hydrogen generating apparatus 10 and the fuel cell system 100 are carried out by the execution of the control program stored in the memory unit 42 by the calculating unit 41 of the controller 40.

Upon the start-up of the fuel cell system 100, the controller 40 controls the first three-way valve 71 so that the third port 71*c* is brought into fluid communication with the second port 71*b*. In addition, the controller 40 controls the second three-way valve 72 so that the third port 72*c* is brought into fluid communication with the second port 72*b*.

Next, the controller 40 causes the raw material supplier 2 to supply the town gas as a raw material. With this, the raw material flows through the raw material supply passage 4 to the desulfurizer 7. At that point of time, the adsorption-removal agent disposed in the desulfurizer 7 adsorptively removes sulfur compounds present in the raw material.

In addition, if the concentration of sulfur at the exit of the desulfurizer 7 increases (breakthrough) when the adsorption-removal agent fails to efficiently adsorb sulfur compounds, this requires that either the whole desulfurizer 7 or the adsorption-removal agent disposed in the desulfurizer 7 be replaced prior to breakthrough.

The raw material flowing out from the desulfurizer 7 is fed through the raw material supply passage 4 to the reformer 17 (indicated by arrow 301 in FIG. 1). At this point of time, the controller 40 has not yet caused the water supplier 25 to operate, so that there is no supply of water from the water supplier 25 to the reformer 17. Therefore, the raw material will simply pass through the reformer 17 (the fuel processor 20). The raw material (combustion gas) thus passed is fed through the fuel gas supply passage 27, then through the bypass route 33, and then through the fuel gas exhaust passage 31 to the combustor 19 (indicated by arrow 302 in FIG. 1). In concurrence with this, the controller 40 causes the air supplier 21 to supply combustion air to the combustor 19.

And, the controller 40 causes the combustor 19 to burn combustion gas by combustion air, whereby heat is supplied to the reformer 17, the shift converter, and CO oxidizing device.

And, at the point of time when the temperatures of the reformer 17, the shift converter, and the CO oxidizing device reach their respective predetermined temperatures, the controller 40 causes the water supplier 25 to operate so that water (steam) is supplied to the reformer 17. Water is supplied so that the ratio of steam to carbon (S/C) is three to one. The raw material supplied to the reformer 17 is reformed by steam through the reforming catalyst, and changes to a hydrogen containing gas. Since this hydrogen containing gas contains carbon monoxide, the concentration of carbon monoxide thereof is reduced by the shift converter and the CO oxidizing device, as described above. The hydrogen containing gas (fuel gas) thus reduced in the concentration of carbon monoxide is fed to the fuel gas supply passage 27.

In addition, fuel gas immediately after the start of being supplied from the fuel processor 20 to the fuel gas supply passage 27 has not yet been reduced enough in the concentration of carbon monoxide. Therefore, if such fuel gas is supplied, as it is, to the anode 52 of the fuel cell 50, the anode 52 will be poisoned. To cope with this, the controller 40 causes a supply of fuel gas, through the fuel gas supply passage 27, then through the bypass route 33, and then through the fuel gas exhaust passage 31, to the combustor 19, as in the initial start-up.

Thereafter, when the concentration of carbon monoxide present in the fuel gas supplied from the fuel processor 20 to the fuel gas supply passage 27 is reduced enough, the controller 40 controls the first three-way valve 71 so that the destination with which the third port 71c is brought into fluid communication is switched from the second port 71b to the first port 71a while the controller 40 controls the second three-way valve 72 so that the destination with which the third port 72c is brought into fluid communication is switched from the second port 72b to the first port 72a. As a result of this, the fuel gas supplied from fuel processor 20 to the fuel gas supply passage 27 is now fed to the anode 52 of the fuel cell 50. In concurrence with this, the controller 40 causes the oxidizing gas supplier 60 to operate to supply oxidizing gas to the cathode 53 of the fuel cell 50. By the cell reaction between the fuel gas supplied to the anode 52 and the oxidizing gas supplied to the cathode 53, electric power and heat are generated. In addition, an off-gas (combustion gas) exhausted from the anode 52 is supplied through the fuel gas exhaust passage 31 to the combustor 19 (indicated by arrow 303 in FIG. 1). The supplied off-gas is burnt there.

And, after the desired generation of electric power is performed by the fuel cell system 100, the hydrogen generating apparatus 10 and the fuel cell system 100 shift to their shutdown state. In this shutdown operation, firstly the supply of raw material from the raw material supplier 2 is stopped and, in addition, the supply of water from the water supplier 25 is stopped. As a result of this, no raw material will pass through the reformer 17 and, consequently, no raw material (combustion gas) will be supplied to the combustor 19. Then, the temperatures of the catalysts of the reformer 17 and the other devices decrease because of no supply of raw material from the combustor 19 to the reformer 17 and the other devices. Thereafter, the supply of raw material is provided by the raw material supplier 2 and, after residual gases in the fuel gas distribution route including an anode gas passage (not shown) of the fuel cell 50 are purged out, the supply of raw material is stopped.

Referring next to FIG. 2, a description will be made about the operation of determining the necessity of replacing the desulfurizer 7 disposed in the hydrogen generating apparatus 10 of the present invention. In addition, this operation is conducted by the execution of a control program of FIG. 2 by the calculating unit 41 of the controller 40. Additionally, this control program is executed constantly (including the state in which the hydrogen generating apparatus is being shut down) at a predetermined interval of sampling ($\Delta t$). In addition, the memory unit 42 of the controller 40 stores a first threshold value A and a second threshold value B which values are set with respect to a value of the integrated value of the amount of supply of raw material, and the value of the integrated value of the amount of supply of raw material. The first threshold value A and the second threshold value B correspond respectively to a first threshold value and a second threshold of the present invention. Because, as has already been described above, since the raw material flow meter corresponds to the meter device of the present invention for measuring the amount of sulfur compounds removed by the desulfurizer (the sulfur compound removal amount), the first and the second threshold values A and B (which values are set with respect to the integrated value of the amount of supply of raw material measured by the raw material flow meter) are nothing but the first and the second threshold values of the present invention (which values are each set with respect to the integrated value of the amount of removal of sulfur compounds measured by the meter device for measuring the amount of removal of sulfur compounds (the integrated value of the amount of supply of raw material)). This is the same as in the other embodiments of the present invention. In addition, the relationship between the first threshold value A and the second threshold value B will be described later in detail (see FIG. 3).

Upon the issue of a start-up instruction from the controller 40, the hydrogen generating apparatus 10 performs a start-up process and then enters the normal operation state. And, upon the issue of a shutdown instruction from the controller 40, the hydrogen generating apparatus 10 performs a shutdown process. And, upon the completion of the shutdown process, the hydrogen generating apparatus 10 enters and remains in the shutdown state until the entry of the next time start-up process.

And the controller 40 acquires the value of the rate of flow of raw material fed in from the raw material flow meter 3 during the aforesaid predetermined sampling interval (step S1). Next, the controller 40 update-records to the memory unit 42 a new value of the integrated value of the amount of supply of raw material calculated by the addition of the value (found by the multiplication of the sampling interval $\Delta t$ by the raw material flow rate value derived in step S1) to the integrated value of the amount of supply of raw material retrieved from the memory unit 42 (step S2). And the controller 40 determines whether or not the hydrogen generating apparatus 10 is performing a start-up process or being in operation (step S3). If it is determined that the hydrogen generating apparatus 10 is either performing a start-up process or being in operation, then the controller 40 determines whether or not the integrated value of the amount of supply of raw material, update-recorded in step S2, is greater than or equal to the first threshold value A (step S4). In addition, the first threshold value A is the value in excess of the later-described second threshold value B. If, in step S4, the integrated value of the amount of supply of raw material is greater than or equal to the first threshold value A ("YES" in step S4), the controller 40 then starts a process of stopping the operation of the hydrogen generating apparatus 10 (step S5). And the controller 40 causes the alarm device 30 to provide warning information indicating that the desulfurizer 7 should be replaced (step S6). For example, the controller 40 causes a display part (not shown) as an example of the alarm device 30 to display a message indicating that the desulfurizer 7 should be replaced. In addition, in the event that such warning information is issued from the alarm device 30, the user calls, for example, a manufacturer's maintenance personnel for the replacement of the desulfurizer 7 after the shutdown of the hydrogen generating apparatus 10 (step S7). More specifically, the desulfurizer 7 is replaced as follows. That is, the desulfurizer 7 is detached from the raw material supply passage 4 in the first and the second connecting portions 5 and 12, with the supply of raw material (town gas) from the gas infrastructure 1 towards the desulfurizer 7 blocked off by means of a shutoff valve (not shown) or other like means. And after the completion of the replacement of the desulfurizer 7, the controller 40 resets the integrated value of the amount of supply of raw material to zero (step S8). In addition, during the time until the shutdown operation of the hydrogen generating apparatus 10 is completed, the operation of update-recording the integrated value of the amount of supply of raw material to the memory unit 42 is continued at the given sampling interval Δt.

On the other hand, if, in step S4, the update-recorded value of the integrated value of the amount of supply of raw material is not greater than or equal to the first threshold value A ("NO" in step S4), then the control program returns to step S1.

On the other hand, if it is determined in step S3 that the hydrogen generating apparatus 10 is neither in the start-up process nor in operation ("NO" in step S3), in other words, the hydrogen generating apparatus 10 is either in the shutdown process or in the shutdown state, then it is determined whether the integrated value of the amount of supply of raw material updated in step S2 is greater than or equal to the second threshold value B (step S9). Note that the second threshold value B is the value smaller than the first threshold value A. If it is determined that the updated integrated value of the amount of supply of raw material is greater than or equal to the second threshold value B ("YES" in step S9), the controller 40 then makes a decision that the desulfurizer 7 should be replaced and causes the alarm device 30 to issue warning information to that effect (step S10). For example, the controller 40 causes the display part (not shown) as an example of the alarm device to display a message indicating that the desulfurizer 7 should be replaced. In addition, in the event that such warning information is issued from the alarm device 30, the user calls, for example, a manufacturer's maintenance personnel for the replacement of the desulfurizer 7, and the maintenance personnel replaces the desulfurizer 7, with the hydrogen generating apparatus 10 placed in the shutdown state (step S11). More specifically, the desulfurizer 7 is replaced as follows. That is, the desulfurizer 7 is detached from the raw material supply passage 4 in the first and the second connecting portions 5 and 12, with the supply of raw material (town gas) from the gas infrastructure 1 towards the desulfurizer 7 blocked off by means of a shutoff valve (not shown) or other like means. And after the completion of the replacement of the desulfurizer 7, the controller 40 resets the integrated value of the amount of supply of raw material to zero (step S12).

On the other hand, if, in step S9, the updated integrated value of the amount of supply of raw material is not greater than or equal to the second threshold value B ("NO" in step S9), then the control program returns to step S1.

In addition, in the present embodiment, the controller 40 is configured to provide, in steps S6 and S11, warning information indicating that the desulfurizer 7 should be replaced. However, it may be arranged such that, instead of providing such warning information in steps S6 and S11, the controller 40 will not permit the next time start-up of the hydrogen generating apparatus 10. More specifically, the controller 40 will not permit the start-up of the hydrogen generating apparatus 10 even when a start-up instruction is entered, for example, by an operation of depressing a start-up button (not shown) or the magnitude of electric power load becomes greater than or equal to a predetermined value that requires the start up of the fuel cell system 100. And, together with this, the controller 40 may provide, with the aid of the alarm device 30, warning information indicating that the desulfurizer 7 should be replaced. This not only prevents the hydrogen generating apparatus from continuously operating in the condition that the amount of sulfur compounds has not been reduced enough but also suppresses an energy wasting operation that cannot be continued properly due to the service life of the desulfurizer.

By referring next to FIG. 3, a description will be made about the relationship between the first threshold value A and the second threshold value B of the integrated value of the amount of supply of raw material. In addition, the upper limit value L of the integrated value of the amount of supply of raw material required for calculating the first threshold value A is the integrated value of the amount of supply of raw material (for example, the volume) that the desulfurizer 7 is able to adsorb sulfur compounds until the concentration of sulfur compounds contained in the raw material exhausted from the outlet of the desulfurizer 7 amounts or increases to a predetermined upper limit concentration (for example, 20 ppb). The upper limit value L of the integrated value of the amount of supply of raw material is determined by the performance of the desulfurizer 7 (i.e., the type, the mass, or the amount of adsorption of sulfur per unit mass of the adsorption-removal agent disposed in the desulfurizer 7), and the concentration of sulfur present in the raw material supplied.

Here, the first threshold value A is the value obtained by the subtraction of the amount Z of supply of raw material required for the shutdown of the fuel cell system 100 from the upper limit value L of the integrated value of the amount of supply of raw material. The amount Z of supply of raw material required for the shutdown of the fuel cell system 100 is the amount of supply of raw material required for the purging of residual gases from the fuel gas distribution route in the shutdown operation of the fuel cell system 100. In addition, the first threshold value A may be the value obtained by the subtraction of a value in excess of the amount Z of supply of raw material required for the shutdown of the fuel cell system 100 from the upper limit value L of the integrated value of the amount of supply of raw material.

The second threshold value B is the value obtained by the subtraction of the amount of supply X of raw material required during the period of time from the state in which the fuel cell system 100 is placed in the shutdown state to the state in which the fuel cell system 100 becomes ready to generate electric power, from the first threshold value A. The amount X of supply of raw material, required during the period of time from the state in which the fuel cell system 100 is placed in the shutdown state to the state in which the fuel cell system 100 becomes ready to generate electric power, is the value that is changed depending on the season (i.e., the temperature of outside air). In addition, the second threshold value B may be the value obtained by the subtraction of a value in excess of the amount X of supply of raw material, required during the period of time from the state in which the fuel cell system 100 is placed in the shutdown state to the state in which the fuel cell system 100 becomes ready to generate electric power, from the first threshold value A.

Referring next to FIG. 4, a description will be made about the relationship between the integrated value of the amount of supply of raw material, and the operations of the hydrogen generating apparatus 10 and the fuel cell system 100. FIG. 4 represents four different states (a, β, γ, d) regarding the integrated value of the amount of supply of raw material of the desulfurizer 7. In addition, each of bar graphs ($a_1$, $β_1$, $γ_1$, $d_1$) on the left-hand sides of the states (a, β, γ, d) represents a respective value of the integrated value of the amount of supply of raw material to the desulfurizer 7 before the time that the fuel cell system 100 is started up. In addition, each of bar graphs ($a_2$, $β_2$, $γ_2$, $d_2$) on the right-hand sides of the states (a, β, γ, d) represents a respective result of the addition of the amount of supply of raw material required after the start-up of the fuel cell system 100 to the integrated value of the amount of supply of raw material ($a_1$, $β_1$, $γ_1$, $d_1$) prior to the start-up thereof. In addition, in the following, the amount Y of supply of raw material required for the generation of electric power of the fuel cell system 100 will be described as a constant value for the sake of convenience.

In the first place, a description will be made of the state a.

In the state a, as represented in the bar graph (a1) on the left-hand side, the integrated value of the amount of supply of raw material to the desulfurizer 7 does not yet reach the second threshold value B before the time that the fuel cell system 100 is started up. Therefore, the hydrogen generating apparatus 10 and the fuel cell system 100 each is started up, operated, and shut down as normal. As a result, as represented in the bar graph ($a_2$) on the right-hand side, the integrated value $a_2$ of the amount of supply of raw material to the desulfurizer 7 is the result obtained by the addition of the amounts of supply of raw material (X, Y, Z) respectively required for the start-up, the generation of electric power, and the shutdown of the fuel cell system 100, to the integrated value $a_1$ of the amount of supply of raw material prior to the start-up of the fuel cell system 100, but it has not yet amounted to the second threshold value B.

Next, a description will be made of the state β.

In the state β, as represented in the bar graph ($β_1$) on the left-hand side, the integrated value of the amount of supply of raw material to the desulfurizer 7 does not yet reach the second threshold value B before the time that the fuel cell system 100 is started up. Therefore, the hydrogen generating apparatus 10 and the fuel cell system 100 each is started up, operated, and shut down as normal. As a result, as represented in the bar graph ($β_2$) on the right-hand side, the integrated value, $β_2$, of the amount of supply of raw material to the desulfurizer 7 is the result obtained by the addition of the amounts of supply of raw material (X, Y, Z) respectively required for the start-up, the electric power generation, and the shutdown of the fuel cell system 100, to the integrated value $β_1$ of the amount of supply of raw material prior to the start-up of the fuel cell system 100, being in excess of the second threshold value B. In this case, as in the later-described state d, neither the hydrogen generating apparatus 10 nor the fuel cell system 100 is started up thereafter.

Next, a description will be made of the state γ.

In the state γ, as represented in the bar graph ($γ_1$) on the left-hand side, the integrated value of the amount of supply of raw material to the desulfurizer 7 does no yet reach the second threshold value B before the time that the fuel cell system 100 is started up. Therefore, the hydrogen generating apparatus 10 and the fuel cell system 100 are started up. Then, as represented in the bar graph ($γ_2$) on the right-hand side, the amount X of supply of raw material required for the start-up of the fuel cell system 100 and the amount Y of supply of raw material required for the generation of electric power of the fuel cell system 100 are added to the integrated value of the amount of supply of raw material ($γ_1$) prior to the start-up of the fuel cell system 100, and the integrated value $γ_2$ of the amount of supply of raw material to the desulfurizer 7 exceeds the first threshold value A. More specifically, at the point of time when the desulfurizer 7 is supplied with raw material just by an amount of Y' (Y'<Y), the integrated value of the amount of supply of raw material reaches the first threshold value A. That is to say, since the integrated value of the amount of supply of raw material to the desulfurizer 7 becomes greater than or equal to the first threshold value A, the controller 40 causes the hydrogen generating apparatus 10 and the fuel cell system 100 to stop operating. As a result, the integrated value, $γ_2$, of the amount of supply of raw material to the desulfurizer 7 is further added the amount Z of supply of raw material required for the shutdown of the fuel cell system 100, thereby amounting to the upper limit value L of the integrated value of the amount of supply of raw material. However, since the integrated value $γ_2$ of the amount of supply of raw material to the desulfurizer 7 will not exceed the upper limit value L of the integrated value of the amount of supply of raw material, a raw material containing sulfur compounds of above a predetermined concentration (20 ppb) is prevented from being supplied to the reformer 17. In this case, the desulfurizer 7 is replaced.

Next, a description will be made of the state d.

In the state d, as represented in the bar graph ($d_1$) on the left-hand side, before the time that the fuel cell system 100 is started up, the amount of supply of raw material to the desulfurizer 7 resides between the second threshold value A and the first threshold value B (the integrated value of the amount of supply of raw material is in the same state as represented in the bar graph ($β_2$) on the right-hand side). Therefore, neither the hydrogen generating apparatus 10 nor the fuel cell system 100 is started up. If, in this state, the hydrogen generating apparatus 10 and the fuel cell system 100 are started up, the amount X of supply of raw material required for the start-up of the fuel cell system 100 is provided to the desulfurizer 7. As a result, the integrated value of the amount of supply of raw material to the desulfurizer 7 exceeds the first threshold value (a part indicated by broken line of the state $d_2$), as represented in the bar graph ($d_2$) on the right-hand side, which point of time the hydrogen generating apparatus 10 and the fuel cell system 100 are shut down. Therefore, by avoiding such a start-up, the consumption of raw material required for start-up is prevented.

To sum up, it is arranged in the hydrogen generating apparatus 10 and the fuel cell system 100 of the present embodiment such that the controller 40 makes a decision that the replacement of the desulfurizer 7 is required if the integrated value of the amount of supply of raw material to the desulfurizer 7 becomes greater than or equal to the second threshold value B (which is smaller than the first threshold value A) after the start of the operation of shutting down the hydrogen generating apparatus 10 and the fuel cell system 100, that is, if determined that the remaining service life of the desulfurizer 7 is short. In this case, the controller 40 lets the alarm device 30 issue warning information indicating that the replacement of the desulfurizer 7 is required or will not cause the hydrogen generating apparatus 10 and the fuel cell system 100 to start up. This makes it possible to suppress the wasteful consumption of raw material, thereby contributing to the saving of energy.

In addition, it is arranged in the hydrogen generating apparatus 10 and the fuel cell system 100 of the present embodiment such that, if the integrated value of the amount of supply of raw material to the desulfurizer 7 becomes greater than or equal to the first threshold value A (which is greater than the second threshold value B) when the hydrogen generating apparatus 10 and the fuel cell system 100 are in operation, that is, if determined that the remaining service life of the desulfurizer 7 soon comes to an end, the hydrogen generating apparatus 10 and the fuel cell system 100 are shut down. As a result of this, the supply of raw material, whose content of sulfur compounds has not yet been reduced enough, to the reformer 17 is suppressed and the catalysts disposed in the reformer 17 and the other devices are prevented from being poisoned.

In addition, although in the hydrogen generating apparatus 10 and the fuel cell system 100 of the present embodiment the second threshold value B is set in advance, it may be arranged such that only the first threshold value A is set, and either the second threshold value B or its substitutive index is estimated in the light of the operation condition of the hydrogen generating apparatus 10 or the fuel cell system 100, and such an estimate is used in the same manner as the second threshold value B in the foregoing control program. More specifically, based on the daily operation conditions such as the condition of electric power generation, the frequency of start-up/shutdown et cetera, there is made an estimation of how long the operation will be carried out at the next start-up, and the controller 40 uses the estimated operation time together with the first threshold value A to operate the hydrogen generating apparatus 10 and other devices. In this case, it is determined whether the hydrogen generating apparatus 10 is started up or not, depending on whether the hydrogen generating apparatus 10 or the like is operated just for the estimated operation time is effective or not (whether the efficiency of energy becomes advantaged or not).

Modification

In the hydrogen generating apparatus and the fuel cell system of the first embodiment, there is employed a meter device adapted to measure the amount of supply of raw material itself (a meter device for direct measurement of the amount of supply of raw material), and the description has been made of the case where the amount of supply of raw material itself is measured by means of the meter device. In the present modification, instead of using a meter device adapted to measure the amount of supply of raw material itself, there is employed a meter device (a meter device for indirect measurement of the amount of supply of raw material) adapted to measure a physical quantity regarding the amount of supply of raw material. As the physical quantity regarding the amount of supply of raw material, as describe above, there are given, by way of example, various physical quantities such as the amount of supply of water to the reformer and the length of time of the operation of the hydrogen generating apparatus and, for the case of a fuel cell system in combination of a hydrogen generating apparatus and a fuel cell, the amount of generation of electric power of the fuel cell, the amount of recovery of exhaust heat from the fuel cell, the length of time of the generation of electric power of the fuel cell and so on. Other configurations are the same as in the hydrogen generating apparatus and the fuel cell system of the first embodiment.

Next, by making reference to the flow chart of FIG. 2, a brief description will be made of the operation of determining the necessity of replacement of the desulfurizer 7 disposed in the hydrogen generating apparatus 10 of the present modification. In addition, the determination operation of the present modification includes steps common to those in the flow chart of FIG. 2, and only different steps therefrom will be described.

If the hydrogen generating apparatus 10 of the present modification is either in a start-up process or in operation ("YES" in step S3 of FIG. 2), the controller 40 then makes a decision whether or not the integrated value of the physical quantity regarding the amount of supply of raw material is greater than or equal to a first threshold value A' whereby whether the desulfurizer 7 is to be replaced or not is determined (step S4 of FIG. 2).

On the other hand, if the hydrogen generating apparatus 10 is in a shutdown process or in the shutdown state ("NO" in step S3 of FIG. 2), the controller 40 then makes a decision whether or not the integrated value of the physical quantity regarding the amount of supply of raw material is greater than or equal to a second threshold value B' whereby whether the desulfurizer 7 is to be replaced or not is determined (step S10 of FIG. 2). Operations other than the above are the same as the operations of determining the necessity of replacement of the desulfurizer in the hydrogen generating apparatus of the first embodiment.

Also in the hydrogen generating apparatus and the fuel cell system of the present modification, the same advantageous effects as accomplished in the hydrogen generating apparatus and the fuel cell system of the first embodiment are provided.

In addition, in the hydrogen generating apparatus and the fuel cell system including the hydrogen generating apparatus of the aforesaid present embodiment, the time of "during the start-up process or the time of "during the subsequent normal operation" is used as a concrete time in the operation of the hydrogen generating apparatus at which time whether or not the integrated value of the amount of supply of raw material to the hydrogen generating apparatus is greater than or equal to the first threshold value A is determined. And the second threshold value B is the value obtained by the subtraction of at least the amount X of supply of raw material required during the period of time from the state in which the fuel cell system 100 is placed in the shutdown state to the state in which the fuel cell system 100 becomes ready to generate electric power, from the first threshold value A, so that the possibility that the integrated value of the amount of supply of raw material becomes greater than or equal to the first threshold value A during the start-up process is low; however, with a view to accomplishing improvement in the safety, the integrated value of the amount of supply of raw material and the first threshold value A are compared with each other also during the start-up process, but it does not matter if only the time of "during the normal operation following the start-up process serves as a concrete time during the operation of the hydrogen generating apparatus at which time whether or not the integrated value of the amount of supply of raw material is greater than or equal to the first threshold value A is determined.

Second Embodiment

Figure 5:
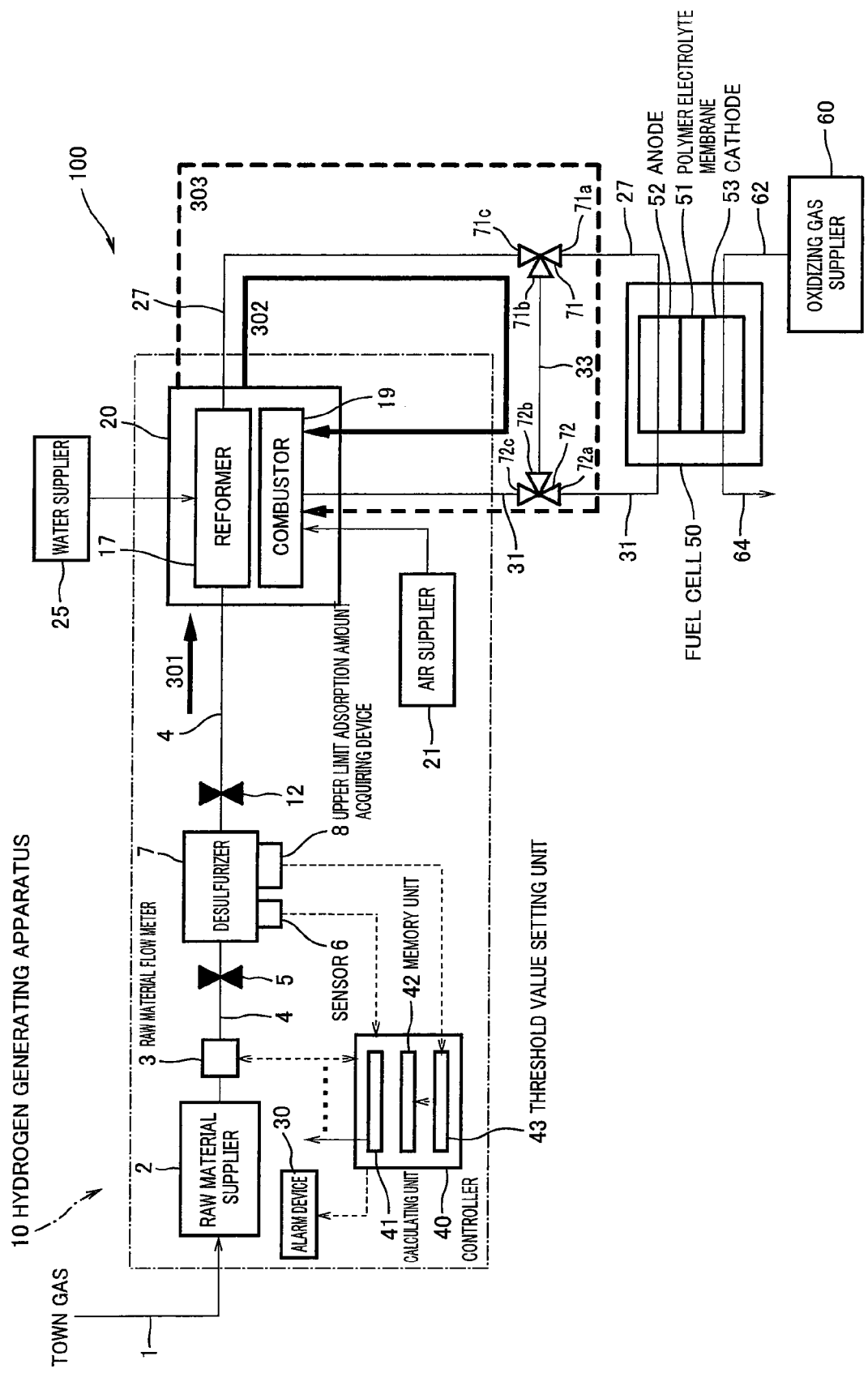
FIG. 5 is a block diagram schematically illustrating the configurations of a hydrogen generating apparatus and a fuel cell system according to a second embodiment of the present invention.

FIG. 5 is a block diagram schematically illustrating the configurations of a hydrogen generating apparatus and a fuel cell system according to a second embodiment of the present invention. Hereinafter, the hydrogen generating apparatus and the fuel cell system of the present embodiment will be described with reference to FIG. 5.

As shown in FIG. 5, in the present embodiment, there is employed a modification of the system for controlling the hydrogen generating apparatus and the fuel cell system of the first embodiment.

More specifically, the present embodiment is equipped with an upper limit adsorption amount acquiring device (an upper limit adsorption amount information acquiring device) 8 for acquiring the upper limit value L' of the amount of adsorption of sulfur of the desulfurizer 7 (the upper limit adsorption amount (the upper limit adsorption amount information)). For example, an IC tag reader is used as the upper limit adsorption amount acquiring device 8 and an IC tag for storing the upper limit value L' of the amount of adsorption of sulfur (which is hereinafter referred to simply as the upper limit value L' in some cases) is attached to the desulfurizer 7. The IC tag reader retrieves from the IC tag the upper limit value L' and inputs it to the threshold value setting unit 43 (described later) of the controller 40. The upper limit value L' is determined by the type and the mass, the amount of adsorption of sulfur per unit mass, or the like of the adsorption-removal agent disposed in the desulfurizer 7.

The upper limit adsorption amount information may be either the information that directly relates to the upper limit of the amount of adsorption of sulfur of the desulfurizer 7 itself or the information that indirectly relates to the upper limit of the amount of adsorption of sulfur of the desulfurizer 7. As the information that indirectly relates to the upper limit adsorption amount, there are given, by way of example, the type, the mass, the amount of adsorption of sulfur per unit mass, or the like of the adsorption-removal agent disposed in the desulfurizer 7.

In addition, the amount of adsorption of sulfur is not limited to the amount of adsorption of sulfur (S) itself, but it includes the amount of adsorption of sulfur compounds (such as the concentration of DMS or TBM for the case of the town gas). Therefore, in the present embodiment, the upper limit value L' of the amount of adsorption of sulfur, acquired by the upper limit adsorption amount information acquiring device 8, is not limited to the amount of adsorption of sulfur (S) itself, but it includes the amount of adsorption of sulfur compounds (such as the concentration of TBM or DMS for the case of the town gas). In addition, if the upper limit value L' is the amount of adsorption of sulfur compounds, not the concentration of sulfur present in the raw material but the concentration of sulfur compounds present in the raw material is used when calculating the first threshold value A and the second threshold value B.

In addition, it may be arranged such that an IC tag reader is used as the sensor 6 and the desulfurizer 7 is mounted an IC tag or such like that stores an individual body number assigned to the desulfurizer 7. In this case, the IC tag reader reads an individual body number from the IC tag for transmission to the controller 40, and the controller 40 makes a decision that a replacement takes place if there is a change in the individual body number of the IC tag. In addition, it does not matter that the replacement information acquiring device is in the form of an input device (not shown) to which information indicating that the desulfurizer is replaced is fed by the user. In addition, it may be arranged such that the IC tag also stores the upper limit adsorption amount information and, for example, by acquiring that information from the IC tag reader, the information regarding the upper limit value of the amount of removal of sulfur compounds of the desulfurizer is acquired. In this case, the controller 40 and the sensor 6 together form the upper limit removal amount information acquiring device 8.

Furthermore, the controller 40 of the present embodiment is equipped with a threshold value setting unit (threshold value setting device) 43. The threshold value setting unit 43 is fed with data about the upper limit value L' acquired by the upper limit adsorption amount acquiring device 8. Based on the thus-entered upper limit value L', the threshold value setting unit 43 calculates the first threshold value A and the second threshold value B that are set with respect to the integrated value of the amount of supply of raw material.

More specifically, the first threshold value A is calculated as follows. That is, the upper limit value L' of the amount of adsorption of sulfur of the desulfurizer 7 is divided by the concentration of sulfur present in the raw material thereby to calculate the upper limit value L of the integrated value of the amount of supply of raw material, and the amount Z of supply of raw material required for the shutdown of the fuel cell system 100 is subtracted from the upper limit value L of the integrated value of the amount of supply of raw material to find the first threshold value A. And, based on the first threshold value A thus found, the second threshold value B is calculated. Additionally, as the concentration of sulfur compounds present in the raw material, the present embodiment employs a constant value such as a nominal value of the raw material in the gas infrastructure, a pre-obtained actually measured value et cetera. The thus-calculated first and second threshold values A and B are stored and set in the memory unit 42 of the control unit 40. Other than the difference that the first threshold value A and the second threshold value B are calculated and stored in the memory unit 42 in the way as described above, the rest of the configuration is the same as in the hydrogen generating apparatus and the fuel cell system of the first embodiment.

Also in the hydrogen generating apparatus 10 and the fuel cell system 100 of the present embodiment, the same advantageous effects as provided in the hydrogen generating apparatus and the fuel cell system of the first embodiment are accomplished.

In addition, in the hydrogen generating apparatus 10 and the fuel cell system 100 of the present embodiment, the above described configurations are employed, thereby making it possible to determine the first threshold value A and the second threshold value B based on the upper limit value L' acquired by the upper limit adsorption amount acquiring device 8. In other words, it is possible to properly set the first threshold value A and the second threshold value B depending on the type, the mass, or the like of the adsorption-removal agent of the desulfurizer 7. This makes it possible to adequately run the hydrogen generating apparatus 10 and the fuel cell system 100 depending on the remaining service life of the desulfurizer 7.

Third Embodiment

Figure 6:
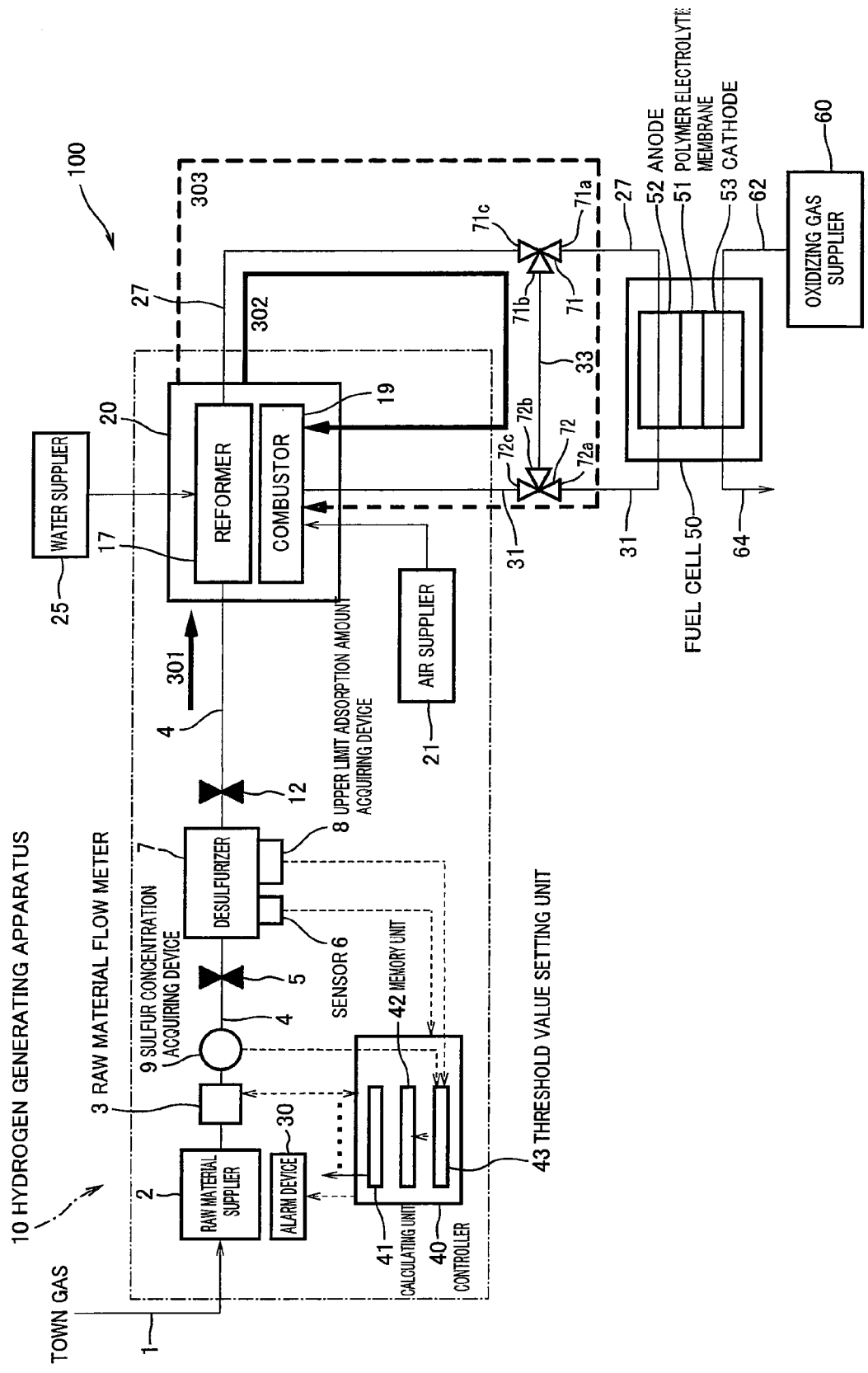
FIG. 6 is a block diagram schematically illustrating the configurations of a hydrogen generating apparatus and a fuel cell system according to a third embodiment of the present invention.

FIG. 6 is a block diagram schematically illustrating the configurations of a hydrogen generating apparatus and a fuel cell system according to a third embodiment of the present invention. FIG. 7 is a diagram representing a correspondence relationship of the concentration of sulfur acquired by the sulfur concentration acquiring device with respect to the first and second threshold values A and B. Hereinafter, referring to FIGS. 6 and 7, the hydrogen generating apparatus and the fuel cell system of the present embodiment will be described.

As shown in FIG. 6, in the hydrogen generating apparatus 10 and the fuel cell system 100 of the present embodiment, there is employed a modification of the configuration of the system for controlling the hydrogen generating apparatus and the fuel cell system of the second embodiment.

More specifically, in the present embodiment, a sulfur concentration acquiring device (sulfur concentration information acquiring device) 9 for acquiring the concentration of sulfur present in the raw material (sulfur concentration information) is disposed in the raw material supply passage 4 between the raw material flow meter and the desulfurizer 7. In addition, the position where the sulfur concentration acquiring device 9 is disposed is not limited to the above position, it may be disposed anywhere in place of the town gas infrastructure 1.

The sulfur concentration acquiring device 9 is formed by a gas concentration sensor as a means for directly acquiring the concentration of sulfur contained in the raw material. In addition, what is meant by the concentration of sulfur" is the concentration of sulfur compounds as an odorant or the concentration of sulfur compounds originally contained in the raw material such as COS, thiophenes et cetera.

And the concentration of sulfur present in the raw material acquired by the sulfur concentration acquiring device 9 is fed to the threshold value setting unit 43. Based on the upper limit value L' acquired by the upper limit adsorption amount acquiring device 8 and the concentration of sulfur present in the raw material fed from the sulfur concentration acquiring device 9, the threshold value setting unit 43 calculates the first threshold value A and the second threshold value B. More specifically, the first threshold value A is calculated as follows. That is, the upper limit value L' of the amount of adsorption of sulfur of the desulfurizer 7 is divided by the concentration of sulfur present in the raw material thereby to calculate the upper limit value L of the integrated value of the amount of supply of raw material, and the amount Z of supply of raw material required for the shutdown of the fuel cell system 100 is subtracted from the upper limit value L of the integrated value of the amount of supply of raw material to find the first threshold value A. And, based on the first threshold value A thus found, the second threshold value B is calculated. The thus-calculated first and second threshold values A and B are stored and set in the memory unit 42. Other than the difference that the first threshold value A and the second threshold value B are calculated and stored in the memory unit 42 in the way as described above, the rest of the configuration is the same as in the hydrogen generating apparatus and the fuel cell system of the second embodiment.

In addition, in the present embodiment, the upper limit value L' of the amount of adsorption of sulfur acquired by the upper limit adsorption amount acquiring device 8 is not limited to the amount of adsorption of sulfur (S) itself, but it includes the amount of adsorption of sulfur compounds (for example, the concentration of TBM or DMS for the case of the town gas). In addition, if the upper limit value L' is the concentration of sulfur compounds, the sulfur concentration information acquired by the sulfur concentration acquiring device 9 is the concentration of sulfur compounds present in the raw material.

In addition, in the case where the upper limit adsorption amount acquiring device 8 is not provided and the specification of the desulfurizer 7 mounted in the fuel cell system 100, i.e., the upper limit adsorption amount L' is pre-determined, the correspondence relationship of the concentration of sulfur present in the raw material acquired by the sulfur concentration acquiring device 9 with respect to the first and second threshold values A and B is stored in the memory unit 42 (see FIG. 7). For example, as shown in FIG. 7, this correspondence relationship shows that, when the sulfur concentration (ppb) is not less than $a_1$ but below $a_2$, the first threshold value A is $A_1$ while the second threshold value B is $B_1$, that, when the sulfur concentration (ppb) is not less than $a_2$ but below $a_3$, the first threshold value A is $A_2$ while the second threshold value B is $B_2$, and that, when the sulfur concentration (ppb) is not less than $a_3$ but below $a_4$, the first threshold value A is $A_3$ while the second threshold value B is $B_3$. Accordingly, it may be configured such that, based on the concentration of sulfur present in the raw material acquired by the sulfur concentration acquiring device 9 and the above correspondence relationship, the threshold value setting unit 43 selects and sets the first and the second threshold values A and B corresponding to the concentration of sulfur present in the raw material.

Also in the hydrogen generating apparatus 10 and the fuel cell system 100 of the present embodiment, the same advantageous effects as provided in the hydrogen generating apparatus and the fuel cell system of the second embodiment are accomplished.

In addition, since the hydrogen generating apparatus 10 and the fuel cell system 100 of the present embodiment are configured as described above, this makes it possible to properly change the first and the second threshold values A and B in response to the concentration of sulfur present in the raw material. This makes it possible to adequately run the hydrogen generating apparatus 10 and the fuel cell system 100 depending upon the remaining service life of the desulfurizer 7.

Fourth Embodiment

Figure 8:
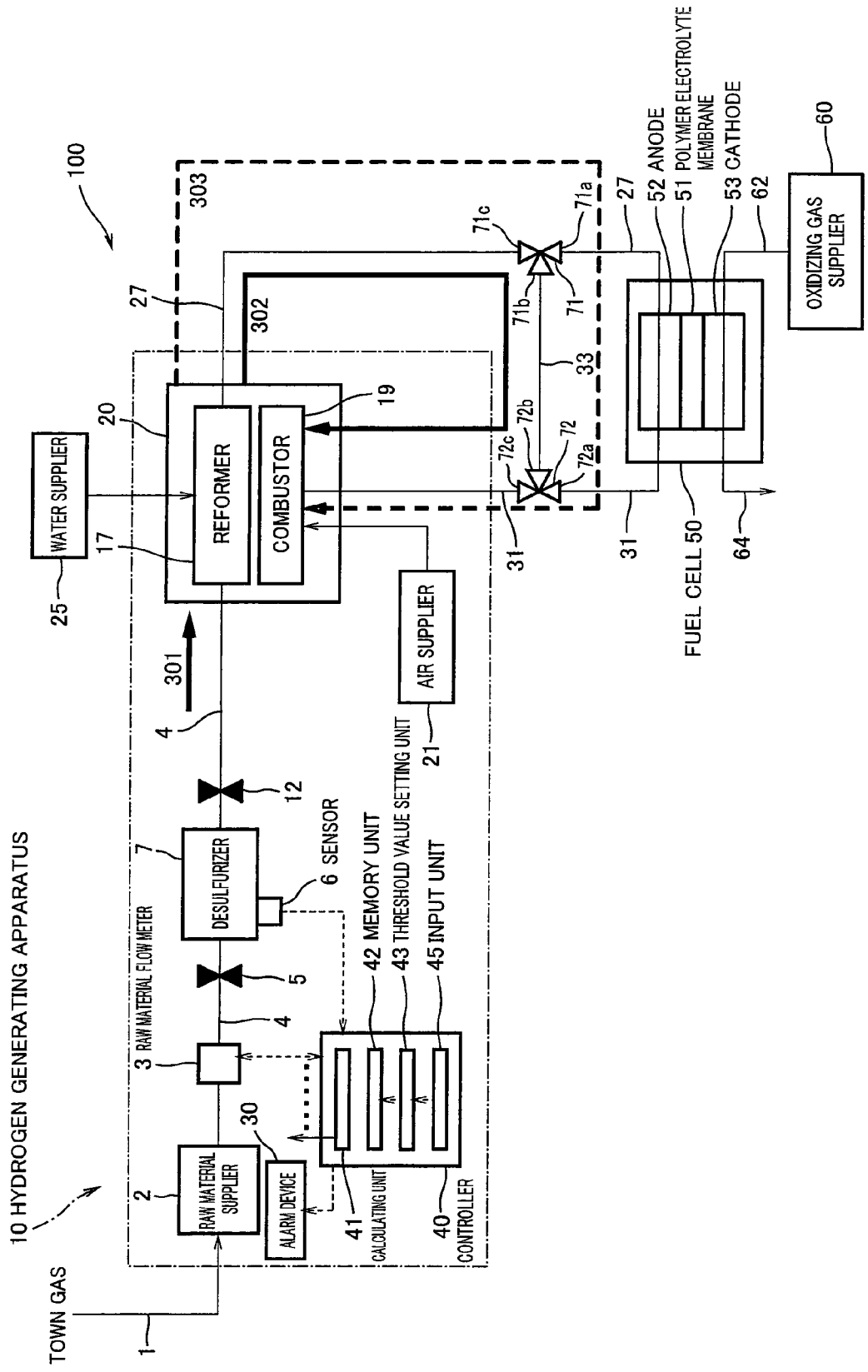
FIG. 8 is a block diagram schematically illustrating the configurations of a hydrogen generating apparatus and a fuel cell system according to a fourth embodiment of the present invention.

FIG. 8 is a block diagram schematically illustrating the configurations of a hydrogen generating apparatus and a fuel cell system according to a fourth embodiment of the present invention. FIG. 9 is a diagram representing a correspondence relationship of the information that indirectly relates to the concentration of sulfur present in the raw material (the company from which a town gas as the raw material is supplied (the gas supply provider)) with respect to the first and second threshold values A and B. Hereinafter, with reference to FIGS. 8 and 9, the hydrogen generating apparatus and the fuel cell system of the present embodiment will be described.

As shown in FIG. 8, in the hydrogen generating apparatus 10 and the fuel cell system 100 of the present embodiment, there is employed a modification of the system for controlling the hydrogen generating apparatus and the fuel cell system of the third embodiment.

More specifically, the controller 40 of the present embodiment includes, in place of the upper limit adsorption amount acquiring device 8 and the sulfur concentration acquiring device 9 of the third embodiment, an input unit 45 to which is input the upper limit value L' of the amount of adsorption of sulfur of the desulfurizer 7 (the upper limit of the amount of adsorption) and the concentration of sulfur present in the raw material, as one example of the upper limit adsorption amount acquiring device and the sulfur concentration acquiring device of the present invention. The input unit 45 is implemented, for example, by a general input device such as a keyboard, a mouse, a selection key, or such like. The upper limit value L of the amount of adsorption and the concentration of sulfur present in the raw material are input through the input unit 45 to the threshold value setting unit 43. In addition, it does not matter if the input unit 45 is configured such that it is fed with pieces of information (for example, numeric data) either directly or indirectly related to the upper limit value L' of the amount of adsorption and the concentration of sulfur present in the raw material. For example, for the case of the upper limit value L' of the amount of adsorption, it may be configured such that information indirectly related to the upper limit of the amount of adsorption, such as the type, the mass, the amount of adsorption of sulfur per unit mass, or the like of the adsorption-removal agent of the desulfurizer 7, is input via the input unit 45. On the other hand, for the case of the concentration of sulfur present in the raw material, it may be configured such that information indirectly related to the concentration of sulfur present in the raw material (e.g., the raw material gas supply company and the concentration of sulfur present in the raw material such as a raw material gas) is input via the input unit 45.

Based on the upper limit value L' input and the concentration of sulfur input, the threshold value setting unit 43 calculates the first threshold value A and the second threshold value B. The thus-calculated first and second threshold values A and B are stored and set in the memory unit 42. Other than the difference that the first threshold value A and the second threshold value B are calculated and stored in the memory unit 42 in the way as described above, the rest of the configuration is the same as in the hydrogen generating apparatus and the fuel cell system of the third embodiment.

In addition, if the upper limit adsorption amount acquiring device 8 is not provided and the specification of the desulfurizer 7 disposed in the fuel cell system 100, i.e., the upper limit adsorption amount L', is pre-determined, the correspondence relationship of the information that is indirectly related to the concentration of sulfur present in the raw material such as the raw material gas supply company or the like with respect to the first and second threshold values A and B (see FIG. 9) is stored in the memory unit 42. For example, as shown in FIG. 9, the correspondence relationship shows that, when the raw material gas supply company is I, the first threshold value A is $A_4$ while the second threshold value B is $B_4$, that, when the raw material gas supply company is II, the first threshold value A is $A_5$ while the second threshold value B is $B_5$, and that, when the raw material gas supply company is III, the first threshold value A is $A_3$ while the second threshold value B is $B_3$. Accordingly, it does not matter that the threshold value setting unit 43 is configured such that, based on the concentration of sulfur present in the raw material acquired by the sulfur concentration acquiring device 9 and the above correspondence relationship, it selects and sets the first and the second threshold values A and B corresponding to the concentration of sulfur present in the raw material.

Also in the hydrogen generating apparatus 10 and the fuel cell system 100 of the present embodiment, the same advantageous effects as provided in the hydrogen generating apparatus and the fuel cell system of the third embodiment are accomplished.

In addition, in the hydrogen generating apparatus 10 and the fuel cell system 100 of the present embodiment, it is possible to properly change the first and the second threshold values A and B based on the upper limit value L' input and the concentration of sulfur input. In addition, even if the concentration of sulfur contained in the raw material gas is not only the information directly related to the concentration of sulfur present in the raw material gas but also the information indirectly related to the concentration of sulfur present in the raw material gas, it is possible to properly change the first threshold value A and the second threshold value B. For example, by making use of the aforesaid difference depending upon the gas supply company which is a supply provider thereby to acquire, by means of the sulfur concentration acquiring device 9, information about a gas company which supplies raw material to where the hydrogen generating apparatus is installed, it becomes possible to properly set the first threshold value A and the second threshold value B. This makes it possible to adequately run the hydrogen generating apparatus 10 and the fuel cell system 100 depending upon the remaining service life of the desulfurizer 7.

Fifth Embodiment

Figure 10:
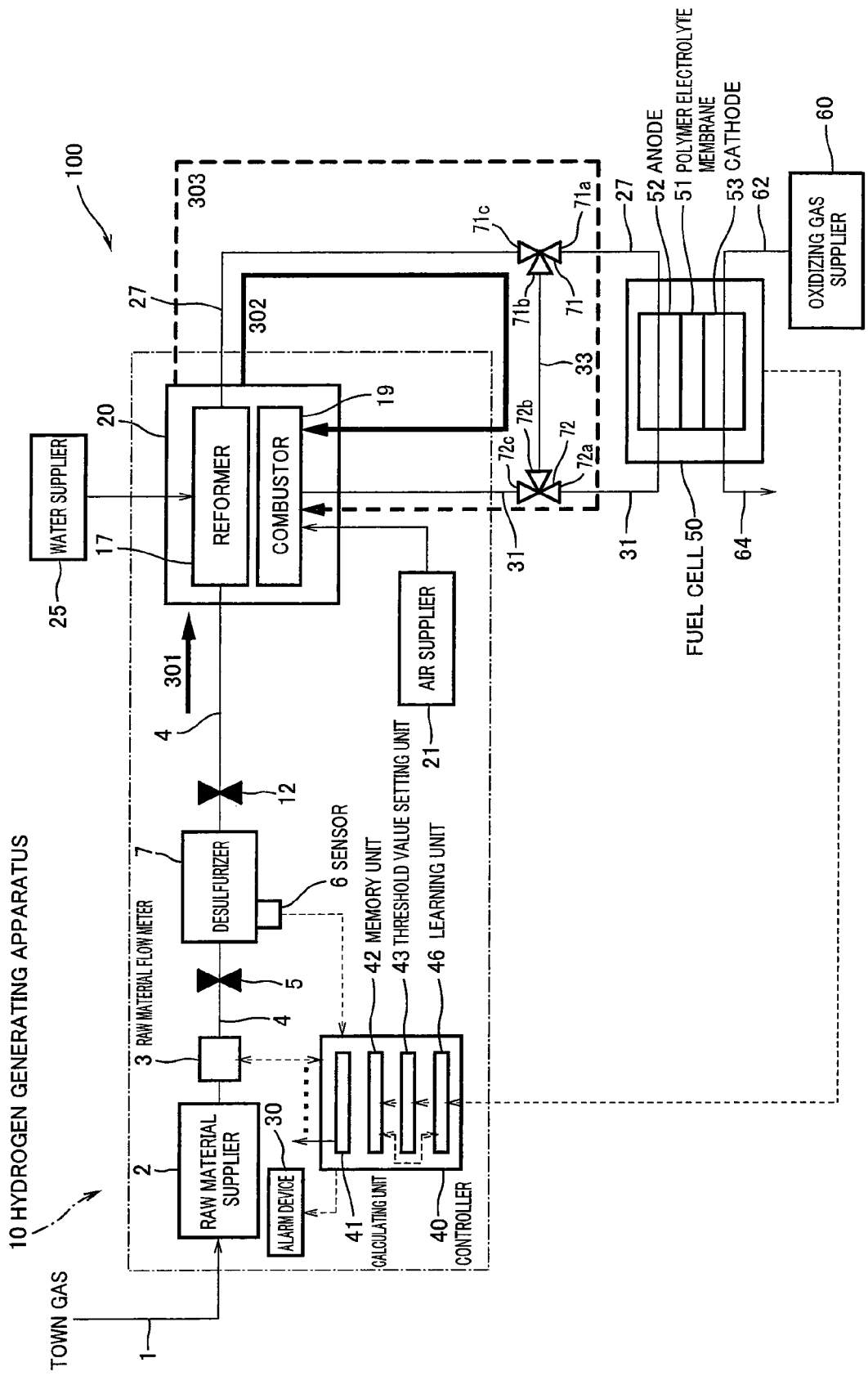
FIG. 10 is a block diagram schematically illustrating the configurations of a hydrogen generating apparatus and a fuel cell system according to a fifth embodiment of the present invention.
Figure 11:
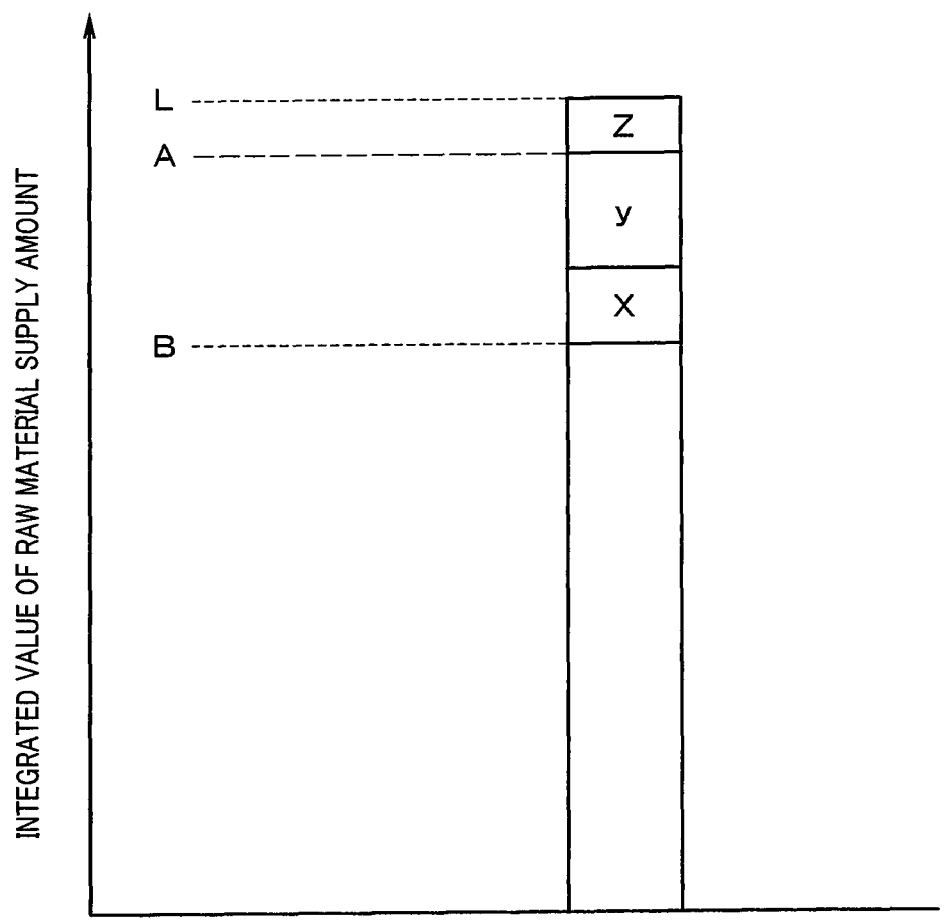
FIG. 11 is a bar graph representing a relationship between the first threshold value and the second threshold value of the integrated value of the amount of supply of raw material in the fifth embodiment.
Figure 12:
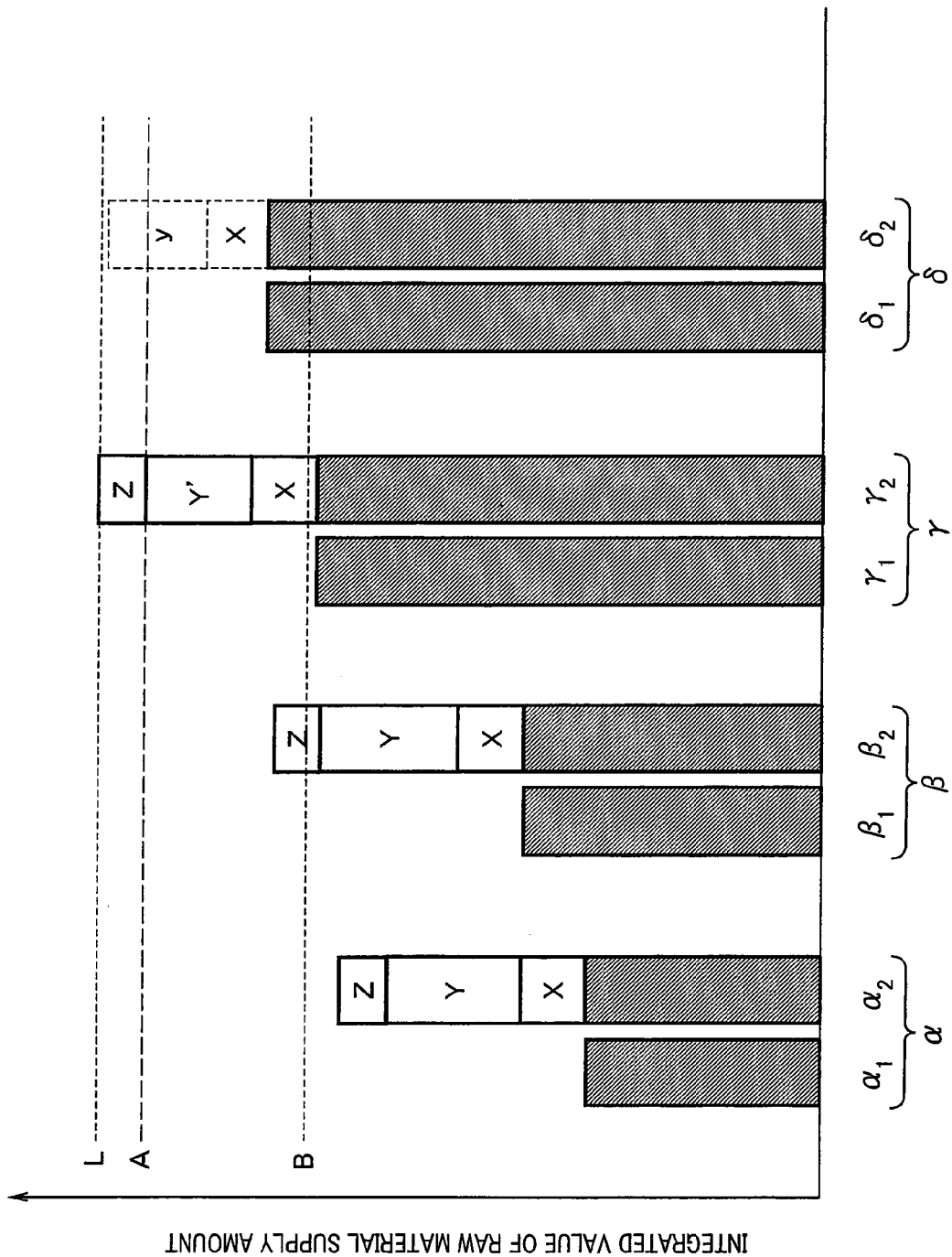
FIG. 12 is a bar graph representing a relationship between the integrated value of the amount of supply of raw material and the operation of the hydrogen generating apparatus in the fifth embodiment.

FIG. 10 is a block diagram schematically illustrating the configurations of a hydrogen generating apparatus and a fuel cell system according to a fifth embodiment of the present invention. FIG. 11 is a bar graph representing a relationship between the first threshold value and the second threshold value of the integrated value of the amount of supply of raw material. FIG. 12 is a bar graph representing a relationship between the integrated value of the amount of supply of raw material and the operation of the hydrogen generating apparatus. Hereinafter, with reference to FIGS. 10 through 12, the hydrogen generating apparatus and the fuel cell system of the present embodiment will be described. Also note that the control program for the hydrogen generating apparatus of the present embodiment is the same as the control program of the first embodiment (FIG. 2) with the exception that the second threshold value B in the integrated value of the amount of supply of raw material differs.

As shown in FIG. 10, in he hydrogen generating apparatus 10 and the fuel cell system 100 of the present embodiment, there is employed a modification of the configuration of the system for controlling the hydrogen generating apparatus and the fuel cell system from the first embodiment.

More specifically, in the present embodiment, the controller 40 further includes a threshold value setting unit 43 and a learning part 46. The learning part 46 acquires and learns the amount of generation of electric power during an individual period of time of the generation of electric power of the fuel cell 50, thereby calculating an estimate (for example, an average value) y of the amount of supply of raw material necessary per a single generation of electric power. Here, a learning method is shown by way of example and its description is made briefly because the learning method itself is well known to those skilled in the art. For example, each time that the amount of generation of electric power in a period of time for a single generation of electric power (hereinafter referred to simply as the electric power generation amount) is acquired, the learning part 46 stores such acquired information in the memory unit 42 and, in each such store, calculates the average value p of the amount of generation of electric power stored in the memory unit 42. And, based on the average value p of the amount of generation of electric power, the theoretical average value (estimate value) y of the amount of supply of raw material is calculated and stored in the memory unit 42. At this point of time, the storage operation is performed such that the currently stored average value y is updated to the newly calculated average value y. The estimate value y of the amount of supply of raw material thus calculated is input to the threshold value setting unit 43, and the first and the second threshold values A and B of the integrated value of the amount of supply of raw material are computed (see FIG. 11 to be described later). The thus-calculated first and second threshold values A and B are stored and set in the memory unit 42. Other configurations are the same as in the hydrogen generating apparatus and the fuel cell system of the first embodiment.

Next, the second threshold value B in the present embodiment will be described with reference to FIG. 11.

As shown in FIG. 11, also in the present embodiment, the first threshold value A is the value obtained by the subtraction of the amount Z of supply of raw material required for the shutdown of the fuel cell system 100 from the upper limit value L of the integrated value of the amount of supply of raw material, as in the first embodiment.

On the other hand, the second threshold value B is the value obtained by the subtraction of the sum of the amount X of supply of raw material required for the start-up of the fuel cell system 100 and the estimate value y of the amount of supply of raw material required per a single generation of electric power of the fuel cell system, from the first threshold value A.

Referring next to FIG. 12, a description will now be made of the relationship between the integrated value of the amount of supply of raw material, and the operation of the hydrogen generating apparatus 10 and the operation of the fuel cell system 100. In addition, in the present embodiment, although the amount of supply of raw material required per a single generation of electric power of the fuel cell system 100 varies, it is described as a predetermined value Y (Y>y) for the sake of simplicity.

In the first place, a description will be made of the state a.

In the state a, as represented in the bar graph (a1) on the left-hand side, the integrated value of the amount of supply of raw material to the desulfurizer 7 does not yet reach the second threshold value B before the time that the fuel cell system 100 is started up. Therefore, the hydrogen generating apparatus 10 and the fuel cell system 100 are each started up, operated, and shut down as normal. As a result, as represented in the bar graph (a2) on the right-hand side, the integrated value a2 of the amount of supply of raw material to the desulfurizer 7 is the result obtained by the addition of the amounts of supply of raw material (X, Y, Z) respectively required for the start-up, the electric power generation, and the shutdown of the fuel cell system 100, to the integrated value a1 of the amount of supply of raw material prior to the start-up of the fuel cell system 100, but it has not yet amounted to the second threshold value B.

Next, a description will be made of the state β.

In the state β, as represented in the bar graph ($\beta_1$) on the left-hand side, the integrated value of the amount of supply of raw material to the desulfurizer 7 does not yet reach the second threshold value B before the time that the fuel cell system 100 is started up. Therefore, the hydrogen generating apparatus 10 and the fuel cell system 100 are each started up, operated, and shut down as normal. As a result, as represented in the bar graph ($\beta_2$) on the right-hand side, the integrated value $\beta_2$ of the amount of supply of raw material to the desulfurizer 7 is the result obtained by the addition of the amounts of supply of raw material (X, Y, Z) respectively required for the start-up, the electric power generation, and the shutdown of the fuel cell system 100, to the integrated value $\beta_1$ of the amount of supply of raw material prior to the start-up of the fuel cell system 100, thereby being in excess of the second threshold value B. In this case, as in the later-described state d, neither the hydrogen generating apparatus 10 nor the fuel cell system 100 is started up thereafter.

Next, a description will be made of the state γ.

In the state γ, as represented in the bar graph ($\gamma_1$) on the left-hand side, the integrated value of the amount of supply of raw material to the desulfurizer 7 does not yet reach the second threshold value B before the time that the fuel cell system 100 is started up. Therefore, the hydrogen generating apparatus 10 and the fuel cell system 100 are started up. Then, as represented in the bar graph ($\gamma_2$) on the right-hand side, the amount X of supply of raw material required for the start-up of the fuel cell system 100 and the amount Y of supply of raw material required for the generation of electric power of the fuel cell system 100 are added to the integrated value $\gamma_1$ of the amount of supply of raw material prior to the start-up of the fuel cell system 100 and, as a result, the integrated value $\gamma_2$ of the amount of supply of raw material to the desulfurizer 7 exceeds the first threshold value A. More specifically, at the point of time that the raw material is supplied just by an amount of Y' (y<Y'<Y), the integrated value of the amount of supply of raw material amounts to the first threshold value A. That is to say, since the integrated value of the amount of supply of raw material to the desulfurizer 7 becomes greater than or equal to the first threshold value A, the controller 40 causes the hydrogen generating apparatus 10 and the fuel cell system 100 to stop operating. As a result, the integrated value $\gamma_2$ of the amount of supply of raw material is further added the amount Z of supply of raw material required for the shutdown of the fuel cell system 100, thereby amounting to the upper limit value L of the integrated value of the amount of supply of raw material. However, since the integrated value ($\gamma_2$) will never exceed the upper limit value L of the integrated value of the amount of supply of raw material, the raw material containing sulfur compounds of above a predetermined concentration (20 ppb) is prevented from being supplied to the reformer 17. In this case, the desulfurizer 7 is replaced.

Next, a description will be made of the state d.

In the state d, as represented in the bar graph ($d_1$) on the left-hand side, before the time that the fuel cell system 100 is started up, the integrated value of the amount of supply of raw material to the desulfurizer 7 resides between the second threshold value A and the first threshold value B (the integrated value of the amount of supply of raw material is in the same state as represented in the bar graph ($\beta_2$) on the right-hand side). Therefore, neither the hydrogen generating apparatus 10 nor the fuel cell system 100 is started up. If, in such a state, the hydrogen generating apparatus 10 and the fuel cell system 100 are started up, the amount X of supply of raw material required for the start-up of the fuel cell system 100 and the estimate value y of the amount of supply of raw material required per a single generation of electric power of the fuel cell system 100 are supplied to the desulfurizer 7 and, as represented in the bar graph ($d_2$) on the right-hand side, the integrated value of the amount of supply of raw material to the desulfurizer 7 exceeds the first threshold value A (a part indicated by broken line in the bar graph ($d_2$)). As a result, at the point of time that the integrated value of the amount of supply of raw material to the desulfurizer 7 exceeds the first threshold value A while the generation of electric power in the fuel cell system 100 has not been carried out enough, the hydrogen generating apparatus 10 and the fuel cell system 100 are shut down. Therefore, by avoiding such a start-up, the consumption of raw material required for the start-up and the consumption of raw material required per a single generation of electric power are suppressed.

Also in the hydrogen generating apparatus 10 and the fuel cell system 100 of the present embodiment, the same advantageous effects as provided in the hydrogen generating apparatus and the fuel cell system of the first embodiment are accomplished.

In addition, if, in the hydrogen generating apparatus 10 and the fuel cell system 100 of the present embodiment, the integrated value of the amount of supply of raw material to the desulfurizer 7 becomes greater than or equal to the second threshold value B (which is smaller than the first threshold value A) after the start of the shutdown process of the hydrogen generating apparatus 10, i.e., if it is determined that the remaining service life of the desulfurizer 7 is not enough to perform a single generation of electric power, the controller 40 then causes the alarm device 30 to issue warning information indicating that the desulfurizer 7 should be replaced or neither the hydrogen generating apparatus 10 nor the fuel cell system 100 is started up. As a result of this, the consumption of raw material required for the start-up of the hydrogen generating apparatus 10 and the consumption of raw material required for a single generation of electric power are prevented, whereby the wasteful consumption of raw material is further suppressed, thereby contributing to the saving of energy.

Sixth Embodiment

A sixth embodiment of the present invention is a simplification of the first embodiment. A hydrogen generating apparatus and a fuel cell system of the present embodiment are identical in their basic configuration with the hydrogen generating apparatus and the fuel cell system of the first embodiment. However, the hydrogen generating apparatus and the fuel cell system of the present embodiment differ from the hydrogen generating apparatus and the fuel cell system of the first embodiment in that, even when the integrated value of the amount of supply of raw material (the integrated value of the amount of removal of sulfur compounds) exceeds the first threshold value A (the first threshold value), the hydrogen generating apparatus and the fuel cell system of the present embodiment are not shut down, but continue to operate. Hereinafter, this difference will be described. More specifically, the hydrogen generating apparatus 10 and the fuel cell system 100 of the present embodiment are identical in their hardware configuration with the hydrogen generating apparatus 10 and the fuel cell system 100 of the first embodiment shown in the block diagram of FIG. 1, but the operation of determining the necessity of replacing the desulfurizer 7 differs.

Desulfurizers are usually filled with a some extra amount of desulfurization agent in the light of the concentration of sulfur present in the raw material, the error of the amount of sulfur compounds measured by the meter device, the operating temperature, the quality of desulfurization agent et cetera. For example, in the present embodiment (and the first embodiment), the first threshold value A is set at about 20 per cent of the upper limit of the amount of removal of sulfur compounds inherent to the desulfurizer. Therefore, in the present embodiment, the hydrogen generating apparatus 10 and the fuel cell system 100 are configured such that, even after the first threshold value A is reached, they continue to operate within the allowed range of time (the range of time up to the upper limit of the amount of removal of sulfur compounds inherent to the desulfurizer).

Figure 13:
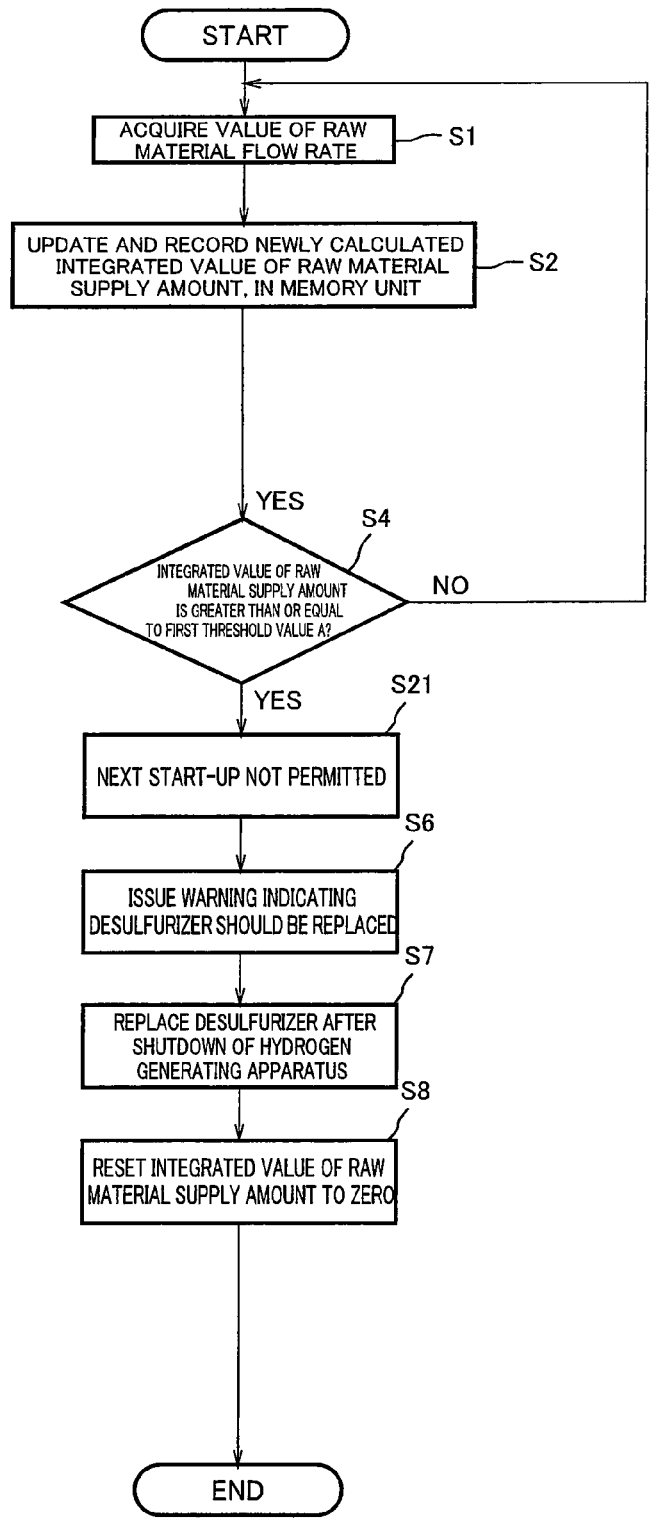
FIG. 13 is a flow chart representing a control program that determines the necessity of replacing a desulfurizer mounted in a hydrogen generating apparatus according to a sixth embodiment of the present invention.

Next, a description will be given of the operations of the hydrogen generating apparatus 10 and the fuel cell system 100 of the present embodiment for determining the necessity of replacement of the desulfurizer 7. FIG. 13 is a flow chart representing a control program that is used to make a decision on the necessity of replacement of the desulfurizer mounted in the hydrogen generating apparatus of the present embodiment. In addition, in FIG. 13, the steps identical or corresponding to those shown in FIG. 2 are assigned the same reference numerals and their description is omitted or simplified.

As shown in FIG. 13, in the present embodiment, unlike the first embodiment, the second threshold value B is not set. In accordance with this, the operations associated with the decision based on the second threshold value B are omitted.

Concretely, the controller 40 first acquires a value indicative of the rate of flow of raw material fed from the raw material flow meter 3 (step S1). Next, the controller 40 update-records a new value of the integrated value of the amount of supply of raw material in the memory unit 42 (step S2). And, the controller 40 makes a decision whether or not the update-recorded integrated value of the amount of supply of raw material is greater than or equal to the first threshold value A (step S4). If it is determined that the integrated value of the amount of supply of raw material is less than the first threshold value A ("NO" in step S4), the controller 40 then returns to step S1. On the other hand, if it is determined that the integrated value of the amount of supply of raw material is greater than or equal to the first threshold value A ("YES" in step S4), the controller 40 will not permit the next time start-up of the hydrogen generating apparatus 10 (step S21). Stated another way, if the hydrogen generating apparatus 10 is being operated, such operation is continued and, after the operation is brought to a stop, the next start-up of the hydrogen generating apparatus 10 is not permitted. Although, in this case, the integrated value of the amount of supply of raw material (the integrated value of the amount of removal of sulfur compounds) exceeds the first threshold value A (the first threshold value), no inconvenience due to the lack of sulfur compound removing capacity of the desulfurizer occurs because the hydrogen generating apparatus 10 is operated within the allowed range of time inherent to the desulfurizer (the range of time up to the upper limit of the amount of removal of sulfur compounds).

Next, the controller 40 causes the alarm device 30 to issue warning information indicating that the desulfurizer 7 should be replaced (step S6). Thereafter, the desulfurizer 7 is replaced after the hydrogen generating apparatus 10 is shut down (step S7). Thereafter, the controller 40 resets the integrated value of the amount of supply of raw material to zero (step S8). This makes it possible to enable the next time start-up of the hydrogen generating apparatus 10.

In accordance with the hydrogen generating apparatus 10 and the fuel cell system 100 of the present embodiment which are configured as described above, it becomes possible that the operation is allowed to continue for a while until the time that the desulfurizer 7 is replaced. As a result, the demerit that the user is unable to use the hydrogen generating apparatus 10 and the fuel cell system 100 is reduced and, in addition, since the user is allowed to make maximum use of the hydrogen generating apparatus 10 and the fuel cell system 100, this makes it possible to maintain the characteristic of the saving of energy saving. In addition, in order to avoid the worst that the desulfurizer 7 remains unreplaced, it is preferred that the upper limit value of the time for which the operation is to be continued is further set in the light of the allowance of the desulfurizer 7.

Embodiment Example

Hereinafter, an embodiment example of the present invention will be described.

In the present embodiment example, the hydrogen generating apparatus 10 and the fuel cell system 100 of the fourth embodiment (see FIG. 8) are employed. And, pieces of information, i.e., 6 μg/L as the concentration of sulfur present in the raw material and 3 g as the capacity of adsorption of sulfur (the upper limit value L' of the amount of adsorption of sulfur) of the desulfurizer 7, were manually entered via the input unit 45. Based on these pieces of information, the upper limit value L' of the amount of adsorption was divided by the concentration of sulfur present in the raw material, whereby the upper limit value L of the integrated value of the amount of supply of raw material was calculated to be 500000 NL by volumetric conversion in the normal condition.

In addition, the start-up characteristic of the fuel cell system 100 was measured under the condition that the output of the fuel cell 50 was 1 kW. The measurement showed that the raw material of 100 NL at most was required during the period of time from when the fuel cell system 100 was in the shutdown state to when the fuel cell system 100 was in the start-up state (in the state ready for the generation of electric power). Therefore, this value was manually entered as the amount X of supply of raw material to the desulfurizer 7 required for the start-up of the fuel cell system 100, via the input unit 45.

Meanwhile, the shutdown characteristic of the fuel cell system 100 was measured in the same condition as above. The measurement showed that the raw material of 30 NL at most was required during the period of time from when the fuel cell system 100 was in the electric power generating state to when the fuel cell system 100 was in the shutdown state. Therefore, this value was manually entered as the amount Z of supply of raw material required for the shutdown of the fuel cell system 100, via the input unit 45.

From the above measurement results, the threshold value setting unit 43 calculated the first threshold value A as follows.

$$A = L - Z$$
$$= 500000 - 30$$
$$= 499970 \ (NL)$$

In addition, from the above measurement results, the threshold value setting unit 43 calculated the second threshold value B as follows.

$$B = A - X$$
$$= 499970 - 100$$
$$= 499870 \ (NL)$$

The first threshold value A and the second threshold value B thus calculated by the threshold value setting unit 43 are stored and set in the memory unit 42.

With the above settings, the operations of the fuel cell system 100 (start-up process, electric power generating process, and shutdown process) were repeatedly carried out, and when the integrated value of the amount of supply of raw material became greater than or equal to the second threshold value B after the start of the previous shutdown process of the fuel cell system 100, it was determined that the replacement of the desulfurizer 7 was required and warning information indicating that the desulfurizer 7 had to be replaced was issued by the alarm device to urge the user to do so. And, the controller 40 did not permit the start-up of the hydrogen generating apparatus 10 and the fuel cell system 100 until the time that the desulfurizer 7 was replaced by the user or a maintenance personnel. Therefore, the difference between the first threshold value A and the second threshold value B, i.e., the amount of raw material of 100 NL, was not consumed in vain.

On the other hand, with the above settings, the operations of the fuel cell system 100 (start-up process, electric power generating process, and shutdown process) were repeatedly carried out, and when the integrated value of the amount of supply of raw material during the operation (the generation of electric power) of the fuel cell system 100 amounted to the first threshold value A, the hydrogen generating apparatus 10 and the fuel cell system 100 moved to their shutdown operation. By means of this, it was prevented that the amount of raw material in excess of the upper limit value L of the integrated value of the amount of supply of raw material was fed to the desulfurizer 7. In addition, it becomes possible to replace the desulfurizer 7 before the capacity of adsorption of the desulfurizer 7 is exceeded.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

INDUSTRIAL APPLICABILITY

The hydrogen generating apparatus and the fuel cell system of the present invention are respectively useful as a hydrogen generating apparatus and a fuel cell system each capable of suppressing the wasteful consumption of raw material depending on the service life of a desulfurizer and capable of providing operation control that contributes to the saving of energy.

The invention claimed is:

1. A method of controlling a hydrogen generating apparatus, comprising:
   (a) removing sulfur compounds present in a raw material supplied to a reformer for generating a hydrogen-containing gas, using a desulfurizer;
   (b) measuring an amount of the sulfur compounds removed in (a), which amount is hereinafter referred to as an amount of removal of sulfur compounds, using a meter device;
   (c) shutting down an operation of the hydrogen generating apparatus when an integrated value of the amount of removal of sulfur compounds measured in (b) is greater than or equal to a first threshold value; and
   (d) inhibiting next start-up of said hydrogen generating apparatus if i) a shut-down process of the hydrogen generating apparatus is started when the integrated value of the amount of removal of sulfur compounds measured in (b) is smaller than the first threshold value and ii) the integrated value of the amount of removal of sulphur compounds measured by said meter device is greater than or equal to a second threshold value which is smaller than the first threshold value before the next start-up.

2. The method according to claim 1, further comprising:
   (e1) acquiring information regarding an upper limit value of the amount of removal of sulfur compounds of the desulfurizer, which information is hereinafter referred to as an upper limit removal amount information; and
   (f1) setting the first threshold value based on the upper limit removal amount information acquired in (e1).

3. The method according to claim 1, further comprising:
   (e2) acquiring information regarding concentration of sulfur present in the raw material, which information is hereinafter referred to as sulfur concentration information; and
   (f2) setting the first threshold value based on the sulfur concentration information acquired in (e2).

4. The method according to claim 1, further comprising:
   (g) performing an operation that urges replacement of the desulfurizer if the integrated value of the amount of removal of sulfur compounds measured in (b) becomes greater than or equal to the first threshold value.

5. The method according to claim 4, wherein the operation that urges the replacement of the desulfurizer in (g) is to provide warning information indicating that the desulfurizer should be replaced, using an alarm device.

6. The method according to claim 1, wherein the desulfurizer is provided with an adsorption-removal agent for adsorption removal of the sulfur compounds present in the raw material.

7. The method according to claim 1, further comprising:
   (h) performing an operation that urges the replacement of the desulfurizer if the integrated value of the measured amount of removal of sulfur compounds becomes greater than or equal to a second threshold value which is smaller than the first threshold value.

8. The method according to claim 7, wherein the operation that urges the replacement of the desulfurizer in (h) is to provide warning information indicating that the desulfurizer should be replaced, using an alarm device.

9. The method according to claim 1, further comprising:
(e1) acquiring information regarding an upper limit value of the amount of removal of sulfur compounds of the desulfurizer, which information is hereinafter referred to as an upper limit removal amount information; and
(f3) setting at least one of the first threshold value and the second threshold value based on the upper limit removal amount information acquired in (e1).

10. The method according to claim 1, further comprising:
(e2) acquiring information regarding concentration of sulfur present in the raw material, which information is hereinafter referred to as sulfur concentration information; and
(f4) setting at least one of the first threshold value and the second threshold value based on the sulfur concentration information acquired in (e2).

11. The method according to claim 1, wherein the second threshold value is a value obtained by subtracting from the first threshold value, at least the amount of removal of sulfur compounds corresponding to the integrated value of an amount of supply of raw material required at a time of start-up of the hydrogen generating apparatus.

12. The method according to claim 1, wherein the second threshold value is a value obtained by subtracting from the first threshold value, a sum of the amount of removal of sulfur compounds corresponding to the integrated value of the amount of supply of raw material required at a time of start-up of the hydrogen generating apparatus and a value less than the amount of removal of sulfur compounds corresponding to an average integrated value of the amount of supply of raw material during an operation of the hydrogen generating apparatus.

13. The method according to claim 1, further comprising:
(i) resetting the integrated value of the amount of removal of sulfur compounds measured by the meter device to zero after the replacement of the desulfurizer.

14. The method according to claim 1, wherein:
(c) includes:
(c1), if the integrated value of the amount of removal of sulfur compounds measured in (b) becomes greater than or equal to the first threshold value, continuing the operation of the hydrogen generating apparatus; and
(c2), thereafter, if the hydrogen generating apparatus is shut down, inhibiting the start-up thereof.

15. A method of controlling a fuel cell system, comprising:
(a) removing sulfur compounds present in a raw material supplied to a reformer for generating a hydrogen-containing gas, using a desulfurizer;
(b) measuring an amount of the sulfur compounds removed in (a), which amount is hereinafter referred to as an amount of removal of sulfur compounds, using a meter device;
(c) shutting down an operation of the hydrogen generating apparatus when an integrated value of the amount of removal of sulfur compounds measured in (b) is greater than or equal to a first threshold value; and
(d) starting a shut-down process of the hydrogen generating apparatus if the integrated value of the amount of removal of sulfur compounds measured in (b) is smaller than the first threshold value and inhibiting next start-up if the integrated value is greater than or equal to a second threshold value which is smaller than the first threshold value before the start-up.

* * * * *